US012756614B2

(12) United States Patent
Hu et al.

(10) Patent No.: US 12,756,614 B2
(45) Date of Patent: Oct. 6, 2026

(54) DATA SENDING METHOD, DATA RECEIVING METHOD, AND RELATED APPARATUS

(71) Applicant: HUAWEI TECHNOLOGIES CO., LTD., Shenzhen (CN)

(72) Inventors: Yuanzhou Hu, Shanghai (CN); Qi Feng, Shanghai (CN); Xiaoyan Bi, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 565 days.

(21) Appl. No.: 18/361,562

(22) Filed: Jul. 28, 2023

(65) Prior Publication Data

US 2023/0379206 A1 Nov. 23, 2023

Related U.S. Application Data

(63) Continuation of application No. PCT/CN2022/072687, filed on Jan. 19, 2022.

(30) Foreign Application Priority Data

Jan. 30, 2021 (CN) ........................ 202110131880.6

(51) Int. Cl.
*H04L 27/34* (2006.01)
*H04L 27/26* (2006.01)

(52) U.S. Cl.
CPC .......... *H04L 27/34* (2013.01); *H04L 27/2615* (2013.01); *H04L 27/2636* (2013.01)

(58) Field of Classification Search
CPC . H04L 27/34; H04L 27/2615; H04L 27/2636; H04L 27/2621; H04L 27/3405; H04L 27/3444
See application file for complete search history.

(56) References Cited

U.S. PATENT DOCUMENTS

2008/0240311 A1* 10/2008 Piirainen ............. H04L 27/2675 375/E7.041
2010/0165829 A1* 7/2010 Narasimha .......... H04L 27/2614 370/344

(Continued)

FOREIGN PATENT DOCUMENTS

CN 111200571 A 5/2020
WO 2010062230 A1 6/2010

OTHER PUBLICATIONS

"3rd Generation Partnership Project; Technical Specification Group Radio Access Network; NR; Physical channels and modulation (Release 15)," 3GPP TS 38.211 V15.8.0, Total 97 pages (Dec. 2019).

*Primary Examiner* — Oussama Roudani
(74) *Attorney, Agent, or Firm* — Leydig, Voit & Mayer, Ltd.

(57) ABSTRACT

This application discloses a data sending method, a data receiving method, and a related apparatus. First phase rotation is performed on modulated data to obtain time domain rotated data. Frequency domain transform is performed on the time domain rotated data to obtain frequency domain data. Second phase rotation is performed on the frequency domain data to obtain frequency domain rotated data. Time domain transform is performed on the frequency domain rotated data to obtain time domain data. The time domain data is sent. Therefore, phase rotation may be separately performed on the modulated data and the frequency domain data based on an SC-FDMA waveform, to reduce a maximum amplitude of the time domain data and reduce a PAPR of the sent time domain data.

17 Claims, 9 Drawing Sheets

(56) References Cited

U.S. PATENT DOCUMENTS

| | | | |
|---|---|---|---|
| 2011/0090993 | A1 | 4/2011 | Zhang et al. |
| 2011/0228878 | A1* | 9/2011 | Sorrentino ............ H04L 5/0023 375/295 |
| 2016/0211999 | A1* | 7/2016 | Wild ................... H04L 25/0204 |
| 2017/0338989 | A1* | 11/2017 | Wu ....................... H04L 27/262 |
| 2019/0165826 | A1 | 5/2019 | Goto et al. |
| 2024/0396781 | A1* | 11/2024 | Kuchi ............... H04L 27/26416 |

* cited by examiner

DATA SENDING METHOD, DATA RECEIVING METHOD, AND RELATED APPARATUS

CROSS-REFERENCE TO RELATED APPLICATIONS

This application is a continuation of International Application No. PCT/CN2022/072687, filed on Jan. 19, 2022, which claims priority to Chinese Patent Application No. 202110131880.6, filed on Jan. 30, 2021. The disclosures of the aforementioned applications are hereby incorporated by reference in their entireties.

TECHNICAL FIELD

This application relates to the communication field, and in particular, to a data sending method, a data receiving method, and a related apparatus.

BACKGROUND

An orthogonal frequency division multiplexing (Orthogonal Frequency Division Multiplexing, OFDM) waveform is used to perform resource mapping on modulated data and then perform inverse Fourier transform to obtain time domain data. A single carrier frequency division multiple access (single carrier frequency domain multiple access, SC-FDMA) waveform is used to perform Fourier transform on modulated data to obtain frequency domain data, perform resource mapping on the frequency domain data, and then perform inverse Fourier transform to obtain time domain data. A peak to average power ratio (Peak to Average Power Ratio, PAPR, also referred to as a peak-to-average power ratio) of the SC-FDMA waveform is lower than a PAPR of the OFDM waveform.

New radio (New Radio, NR) introduces an SC-FDMA waveform of Pi/2-BPSK modulation. In addition, filtering may be performed to reduce a PAPR to about 2 dB. However, a modulation order of Pi/2-BPSK modulation is low, and provided spectrum efficiency (spectrum efficiency, SE) is limited. For SC-FDMA waveforms with higher-order modulation such as QPSK, 16 QAM, and 64 QAM compared with the Pi/2-BPSK modulation, how to reduce a PAPR is still a problem.

SUMMARY

Embodiments of this application provide a data sending method, a data receiving method, and a related apparatus. Phase rotation may be separately performed on modulated data and frequency domain data based on an SC-FDMA waveform, to reduce a maximum amplitude of time domain data and reduce a PAPR of the sent time domain data.

According to a first aspect, an embodiment of this application provides a data sending method, applied to a terminal device. The method includes:

- performing first phase rotation on modulated data to obtain time domain rotated data;
- performing frequency domain transform on the time domain rotated data to obtain frequency domain data;
- performing second phase rotation on the frequency domain data to obtain frequency domain rotated data;
- performing time domain transform on the frequency domain rotated data to obtain time domain data; and
- sending the time domain data.

Therefore, in this application, phase rotation is performed on each element in the modulated data, and in addition, phase rotation is performed on first frequency domain data, so that a superposition effect of time domain data corresponding to different modulated data can be improved, and a maximum value of time domain data obtained through superposition is reduced, thereby reducing a PAPR. In addition, although operations of the first phase rotation and the second phase rotation are introduced in this embodiment, increased complexity is small relative to a conventional SC-FDMA waveform.

With reference to the first aspect, in a possible implementation, the modulated data includes a first channel of modulated data, and the performing first phase rotation on modulated data to obtain time domain rotated data includes:

- obtaining a first data length of the first channel of modulated data;
- determining a first phase factor based on the first data length; and
- performing phase rotation on the modulated data based on the first phase factor, to obtain the time domain rotated data.

With reference to the first aspect, in a possible implementation, the performing second phase rotation on the frequency domain data to obtain frequency domain rotated data includes:

- obtaining a phase factor corresponding to the frequency domain data, and obtaining a phase factor corresponding to conjugate data of the frequency domain data; and
- performing phase rotation on the frequency domain data and the conjugate data based on the phase factor corresponding to the frequency domain data and the phase factor corresponding to the conjugate data, to obtain the frequency domain rotated data.

In this example, the first phase factor and a second phase factor are determined, so that there is no interference between different elements of first modulated data demodulated by a receiver and between a real part and an imaginary part of a same element, to avoid a demodulation performance loss.

With reference to the first aspect, in a possible implementation, the modulated data includes a first channel of modulated data and a second channel of modulated data, and the performing first phase rotation on modulated data to obtain time domain rotated data includes:

- obtaining a first data length of the first channel of modulated data, and obtaining a second data length of the second channel of modulated data;
- determining a first phase factor based on the first data length, and determining a second phase factor based on the second data length;
- performing phase rotation on the first channel of modulated data based on the first phase factor, to obtain a first channel of time domain rotated data; and
- performing phase rotation on the second channel of modulated data based on the second phase factor, to obtain a second channel of time domain rotated data.

With reference to the first aspect, in a possible implementation, the frequency domain data includes a first channel of frequency domain data and a second channel of frequency domain data, and the performing second phase rotation on the frequency domain data to obtain frequency domain rotated data includes:

- determining a third phase factor based on a first data length of the first channel of frequency domain data, and determining a fourth phase factor based on a second data length of the second channel of frequency domain data;

performing phase rotation on the first channel of frequency domain data based on the third phase factor, to obtain a first channel of frequency domain rotated data; and performing phase rotation on the second channel of frequency domain data based on the fourth phase factor, to obtain a second channel of frequency domain rotated data.

In this example, because different cyclic shifts are generated between time domain data corresponding to the first channel of modulated data and time domain data corresponding to the second channel of modulated data, the two channels of modulated data interfere with each other. In this application, a special phase factor design in the first phase rotation and the second phase rotation is introduced, to ensure that interference between the two channels of modulated data can be entirely eliminated, and orthogonality between the two channels of modulated data is implemented, thereby not affecting demodulation performance.

With reference to the first aspect, in a possible implementation, the first data length is equal to the second data length;

the third phase factor is determined by using a method shown in the following formula:

$$P_3(k) = e^{j\pi\theta_0 k} e^{j\pi\omega_0}, \text{ where}$$

$P_3(k)$ is a $k^{th}$ element of the third phase factor, and $\theta_0$ and $\omega_0$ are constants related to the first data length; and the fourth phase factor is determined by using a method shown in the following formula:

$$P_4(k) = e^{j\pi\theta_1 k} e^{j\pi\omega_1}, \text{ where}$$

$P_4(k)$ is a $k^{th}$ element of the fourth phase factor, and $\theta_1$ and $\omega_1$ are constants related to the first data length; and $\theta_0$, $\theta_1$, $\omega_0$, and $\omega_1$ satisfy the following relationship:

$$\omega_1 - \omega_0 = -\frac{1}{2}(\theta_1 - \theta_0)(M - 1) + p; \text{ or}$$

$$\omega_1 - \omega_0 = \frac{1}{2} - \frac{1}{2}(\theta_1 - \theta_0)(M - 1) + p,$$

where p is any integer, and M is the first data length.

With reference to the first aspect, in a possible implementation, the first phase factor, the second phase factor, the third phase factor, and the fourth phase factor may alternatively be prestored phase factors, and are specifically stored in a network device and the terminal device. The terminal device and the network device obtain the third phase factor and the fourth phase factor in a reading manner.

With reference to the first aspect, in a possible implementation, the first phase factor, the second phase factor, the third phase factor, and the fourth phase factor may alternatively be indicated by the network device by using signaling, for example, higher layer signaling or dynamic signaling, and sent to the terminal device.

With reference to the first aspect, in a possible implementation, the performing time domain transform on the frequency domain rotated data to obtain time domain data includes:

performing addition and combination on the first channel of frequency domain rotated data and the second channel of frequency domain rotated data to obtain combined frequency domain rotated data, where a data length of the combined frequency domain rotated data is the same as the first data length; and performing time domain transform on the combined frequency domain rotated data to obtain the time domain data.

With reference to the first aspect, in a possible implementation, the performing time domain transform on the frequency domain rotated data to obtain time domain data includes:

combining on the first channel of frequency domain rotated data and the second channel of frequency domain rotated data to obtain combined frequency domain rotated data, where a data length of the combined frequency domain rotated data is greater than the first data length;

performing frequency domain filtering on the combined frequency domain rotated data to obtain filtered data; and performing time domain transform on the filtered data to obtain the time domain data.

With reference to the first aspect, in a possible implementation, the first phase factor is determined by using a method shown in the following formula:

$$P_1(m) = e^{-j\frac{\pi}{M}m};$$

$$P_1(m) = e^{-j(\frac{\pi}{M}+\frac{\pi}{2})m};$$

$$P_1(m) = e^{-j(\frac{\pi}{M}-\frac{\pi}{2})m};$$

$$P_1(m) = e^{j\frac{\pi(M-1)}{M}m}; \text{ or}$$

$$P_1(m) = e^{-j\frac{\pi(M+1)}{M}m},$$

where m is an index value, $P_1(m)$ is an $m^{th}$ element of the first phase factor, j is an imaginary symbol, and M is the first data length.

According to a second aspect, an embodiment of this application provides a data receiving method, applied to a network device. The method includes:

receiving first time domain data;

performing frequency domain transform on the first time domain data to obtain frequency domain data;

performing second phase rotation on the frequency domain data to obtain frequency domain rotated data;

performing time domain transform on the frequency domain rotated data to obtain second time domain data; and performing first phase rotation on the second time domain data to obtain modulated data.

With reference to the second aspect, in a possible implementation, the frequency domain rotated data includes a first channel of frequency domain rotated data and a second channel of frequency domain rotated data, and the performing second phase rotation on the frequency domain data to obtain frequency domain rotated data includes:

obtaining a third phase factor and a fourth phase factor;

performing phase rotation on the frequency domain data based on the third phase factor, to obtain the first channel of frequency domain rotated data; and performing phase rotation on the frequency domain data based on the fourth phase factor, to obtain the second channel of frequency domain rotated data.

With reference to the second aspect, in a possible implementation, the performing time domain transform on the frequency domain rotated data to obtain second time domain data includes:

performing time domain transform on the first channel of frequency domain rotated data to obtain a first channel of time domain data; and performing time domain transform on the second channel of frequency domain rotated data to obtain a second channel of time domain data.

With reference to the second aspect, in a possible implementation, the modulated data includes a first channel of modulated data and a second channel of modulated data, and the performing first phase rotation on the second time domain data to obtain modulated data includes:

determining a first phase factor based on a first data length of the first channel of time domain data, and determining a second phase factor based on a second data length of the second channel of time domain data;

performing phase rotation on the first channel of time domain data based on the first phase factor, to obtain a first channel of demodulated modulated data;

performing phase rotation on the second channel of time domain data based on the second phase factor, to obtain a second channel of demodulated modulated data;

performing data extraction on the first channel of demodulated modulated data to obtain the first channel of modulated data; and performing data extraction on the second channel of demodulated modulated data to obtain the second channel of modulated data.

With reference to the second aspect, in a possible implementation, the performing second phase rotation on the frequency domain data to obtain frequency domain rotated data, and obtain frequency domain rotated data includes:

obtaining a phase factor corresponding to the frequency domain data, and obtaining a phase factor corresponding to conjugate data of the frequency domain data; and performing phase rotation on the frequency domain data and the conjugate data based on the phase factor corresponding to the frequency domain data and the phase factor corresponding to the conjugate data, to obtain the frequency domain rotated data.

With reference to the second aspect, in a possible implementation, the modulated data includes a first channel of modulated data, and the performing first phase rotation on the second time domain data to obtain modulated data includes:

determining a first phase factor based on a first data length of the first channel of modulated data; and performing phase rotation on the second time domain data based on the first phase factor, to obtain the first channel of modulated data.

According to a third aspect, an embodiment of this application provides a terminal device. The device includes:

a first phase rotation unit, configured to perform first phase rotation on modulated data to obtain time domain rotated data;

a frequency domain transform unit, configured to perform frequency domain transform on the time domain rotated data to obtain frequency domain data;

a second phase rotation unit, configured to perform second phase rotation on the frequency domain data to obtain frequency domain rotated data;

a time domain transform unit, configured to perform time domain transform on the frequency domain rotated data to obtain time domain data; and a sending unit, configured to send the time domain data.

With reference to the third aspect, in a possible implementation, the modulated data includes a first channel of modulated data, and the first phase rotation unit is configured to:

obtain a first data length of the first channel of modulated data;

determine a first phase factor based on the first data length; and perform phase rotation on the modulated data based on the first phase factor, to obtain the time domain rotated data.

With reference to the third aspect, in a possible implementation, the second phase rotation unit is configured to:

obtain a phase factor corresponding to the frequency domain data, and obtain a phase factor corresponding to conjugate data of the frequency domain data; and perform phase rotation on the frequency domain data and the conjugate data based on the phase factor corresponding to the frequency domain data and the phase factor corresponding to the conjugate data, to obtain the frequency domain rotated data.

With reference to the third aspect, in a possible implementation, the modulated data includes a first channel of modulated data and a second channel of modulated data, and the first phase rotation unit is configured to:

obtain a first data length of the first channel of modulated data, and obtain a second data length of the second channel of modulated data;

determine a first phase factor based on the first data length, and determine a second phase factor based on the second data length;

perform phase rotation on the first channel of modulated data based on the first phase factor, to obtain a first channel of time domain rotated data; and perform phase rotation on the second channel of modulated data based on the second phase factor, to obtain a second channel of time domain rotated data.

With reference to the third aspect, in a possible implementation, the frequency domain data includes a first channel of frequency domain data and a second channel of frequency domain data, and the second phase rotation unit is configured to:

determine a third phase factor based on a first data length of the first channel of frequency domain data, and determine a fourth phase factor based on a second data length of the second channel of frequency domain data;

perform phase rotation on the first channel of frequency domain data based on the third phase factor, to obtain a first channel of frequency domain rotated data; and perform phase rotation on the second channel of frequency domain data based on the fourth phase factor, to obtain a second channel of frequency domain rotated data.

With reference to the third aspect, in a possible implementation, the first data length is equal to the second data length;

the third phase factor is determined by performing a method shown in the following formula:

$$P_3(k) = e^{j\pi\theta_0 k} e^{j\pi\omega_0}, \text{ where}$$

$P_3(k)$ is a $k^{th}$ element of the third phase factor, and $\theta_0$ and $\omega_0$ are constants related to the first data length; and the fourth phase factor is determined by performing a method shown in the following formula:

$$P_4(k) = e^{j\pi\theta_1 k} e^{j\pi\omega_1}, \text{ where}$$

$P_4(k)$ is a $k^{th}$ element of the fourth phase factor, and $\theta_1$ and $\omega_1$ are constants related to the first data length; and $\theta_0$, $\theta_1$, $\omega_0$, and $\omega_1$ satisfy the following relationship:

$$\omega_1 - \omega_0 = -\frac{1}{2}(\theta_1 - \theta_0)(M - 1) + p; \text{ or}$$

$$\omega_1 - \omega_0 = \frac{1}{2} - \frac{1}{2}(\theta_1 - \theta_0)(M - 1) + p,$$

where p is any integer, and M is the first data length.

With reference to the third aspect, in a possible implementation, the time domain transform unit is configured to:

perform addition and combination on the first channel of frequency domain rotated data and the second channel of frequency domain rotated data to obtain combined frequency domain rotated data, where a data length of the combined frequency domain rotated data is the same as the first data length; and perform time domain transform on the combined frequency domain rotated data to obtain the time domain data.

With reference to the third aspect, in a possible implementation, the time domain transform unit is configured to:

combine the first channel of frequency domain rotated data and the second channel of frequency domain rotated data to obtain combined frequency domain rotated data, where the combined frequency domain rotated data is greater than the first data length;

perform frequency domain filtering on the combined frequency domain rotated data to obtain filtered data; and perform time domain transform on the filtered data to obtain the time domain data.

With reference to the third aspect, in a possible implementation, the first phase factor is determined by performing a method shown in the following formula:

$$P_1(m) = e^{-j\frac{\pi}{M}m};$$

$$P_1(m) = e^{-j(\frac{\pi}{M}+\frac{\pi}{2})m};$$

$$P_1(m) = e^{-j(\frac{\pi}{M}-\frac{\pi}{2})m};$$

$$P_1(m) = e^{j\frac{\pi(M-1)}{M}m}; \text{ or}$$

$$P_1(m) = e^{-j\frac{\pi(M+1)}{M}m},$$

where m is an index value, $P_1(m)$ is an $m^{th}$ element of the first phase factor, j is an imaginary symbol, and M is the first data length.

According to a fourth aspect, an embodiment of this application provides a network device. The device includes:

a receiving unit, configured to receive first time domain data;

a frequency domain transform unit, configured to perform frequency domain transform on the first time domain data to obtain frequency domain data;

a second phase rotation unit, configured to perform second phase rotation on the frequency domain data to obtain frequency domain rotated data;

a time domain transform unit, configured to perform time domain transform on the frequency domain rotated data to obtain second time domain data; and a first phase rotation unit, configured to perform first phase rotation on the second time domain data to obtain modulated data.

With reference to the fourth aspect, in a possible implementation, the frequency domain rotated data includes a first channel of frequency domain rotated data and a second channel of frequency domain rotated data, and the second phase rotation unit is configured to:

obtain a third phase factor and a fourth phase factor;

perform phase rotation on the frequency domain data based on the third phase factor, to obtain the first channel of frequency domain rotated data; and perform phase rotation on the frequency domain data based on the fourth phase factor, to obtain the second channel of frequency domain rotated data.

With reference to the fourth aspect, in a possible implementation, the time domain transform unit is configured to:

perform time domain transform on the first channel of frequency domain rotated data to obtain a first channel of time domain data; and perform time domain transform on the second channel of frequency domain rotated data to obtain a second channel of time domain data.

With reference to the fourth aspect, in a possible implementation, the modulated data includes a first channel of modulated data and a second channel of modulated data, and the first phase rotation unit is configured to:

determine a first phase factor based on a first data length of the first channel of time domain data, and determine a second phase factor based on a second data length of the second channel of time domain data;

perform phase rotation on the first channel of time domain data based on the first phase factor, to obtain a first channel of demodulated modulated data;

perform phase rotation on the second channel of time domain data based on the second phase factor, to obtain a second channel of demodulated modulated data;

perform data extraction on the first channel of demodulated modulated data to obtain the first channel of modulated data; and perform data extraction on the second channel of demodulated modulated data to obtain the second channel of modulated data.

With reference to the fourth aspect, in a possible implementation, the second phase rotation unit is configured to:

obtain a phase factor corresponding to the frequency domain data, and obtain a phase factor corresponding to conjugate data of the frequency domain data; and perform phase rotation on the frequency domain data and the conjugate data based on the phase factor corresponding to the frequency domain data and the phase factor corresponding to the conjugate data, to obtain the frequency domain rotated data.

With reference to the fourth aspect, in a possible implementation, the modulated data includes a first channel of modulated data, and the first phase rotation unit is configured to:

determine a first phase factor based on a first data length of the first channel of modulated data; and perform phase rotation on the second time domain data based on the first phase factor, to obtain the first channel of modulated data.

According to a fifth aspect, an embodiment of this application provides a terminal device, including:

a memory, configured to store instructions; and at least one processor, coupled to the memory.

When the at least one processor executes the instructions, the instructions enable the processor to perform the method according to the first aspect.

According to a sixth aspect, an embodiment of this application provides a network device, including:

a memory, configured to store instructions; and at least one processor, coupled to the memory.

When the at least one processor executes the instructions, the instructions enable the processor to perform the method according to the second aspect.

According to a seventh aspect, an embodiment of this application provides a computer storage medium. The computer storage medium stores a computer program, and the computer program includes program instructions. When the program instructions are executed by a processor, the processor is enabled to perform all or a part of the methods according to the first aspect and the second aspect.

These aspects or other aspects of this application are more concise and easier to understand in descriptions of the following embodiments.

BRIEF DESCRIPTION OF DRAWINGS

To describe the solutions in embodiments of this application or in the conventional technology more clearly, the following briefly describes the accompanying drawings for describing embodiments or the conventional technology. It is clear that the accompanying drawings in the following descriptions show merely some embodiments of this application, and a person of ordinary skill in the art may still derive other drawings from these accompanying drawings without creative efforts.

DESCRIPTION OF EMBODIMENTS

The following describes embodiments of this application with reference to the accompanying drawings.

Figure 1:
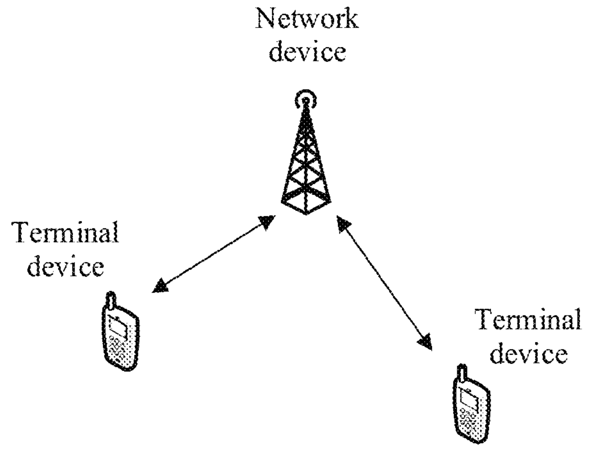
FIG. 1 is a schematic diagram of a communication system according to an embodiment of this application.

First, a system architecture of a communication system to which embodiments of this application are applied is described. As shown in FIG. 1, the system is applied to a wireless communication system such as 5G or satellite communication. The wireless communication system may further include a narrowband internet of things (English: Narrowband Internet of Things, NB-IoT for short) system, a global system for mobile communications (English: Global System for Mobile Communications, GSM for short), an enhanced data rates for GSM evolution (English: Enhanced Data rates for GSM Evolution, EDGE for short) system, a wideband code division multiple access (English: Wideband Code Division Multiple Access, WCDMA for short) system, a code division multiple access 2000 (English: Code Division Multiple Access, CDMA 2000 for short) system, a time division-synchronous code division multiple access (English: Time Division-Synchronization Code Division Multiple Access, TD-SCDMA for short) system, a long term evolution (English: Long Term Evolution, LTE for short) system, and three major application scenarios, namely, eMBB, URLLC, and eMTC, of a next-generation 5G mobile communication system.

The communication system includes a network device and a terminal device. The network device may be, for example, a base station. The base station may include a macro base station, a micro base station (also referred to as a small cell), a relay station, an access point, or the like in various forms. In systems using different wireless access technologies, names of devices functioned as the base station may vary. For example, in an LTE system, the device is referred to as an evolved NodeB (evolved NodeB, eNB or eNodeB); and in a 3rd generation (English: 3rd Generation, 3G for short) system, the device is referred to as a NodeB (English: NodeB). For ease of description, in all embodiments of this application, an apparatus that provides a wireless communication function for an MS is collectively referred to as a network device, a base station, or a BS. In this application, the base station may also be referred to as a network device.

The terminal device may include various handheld devices, vehicle-mounted devices, wearable devices, or computing devices that have a wireless communication function, or other processing devices connected to a wireless modem. The MS may be also referred to as a terminal (English: terminal). The MS may alternatively be a subscriber unit (English: subscriber unit), a cellular phone (English: cellular phone), a smartphone (English: smartphone), a wireless data card, a personal digital assistant (English: Personal Digital Assistant, PDA for short) computer, a tablet computer, a wireless modem (English:

modem), a handset (English: handset), a laptop computer (English: laptop computer), a machine type communication (English: Machine Type Communication, MTC for short) terminal, or the like.

In this application, a sending device may be a terminal device, and a receiving device may be a network device. In this application, a sending device may alternatively be a network device, and a receiving device may be a terminal device. For ease of description, an example in which the sending device is the terminal device is used below for description.

Figure 2:
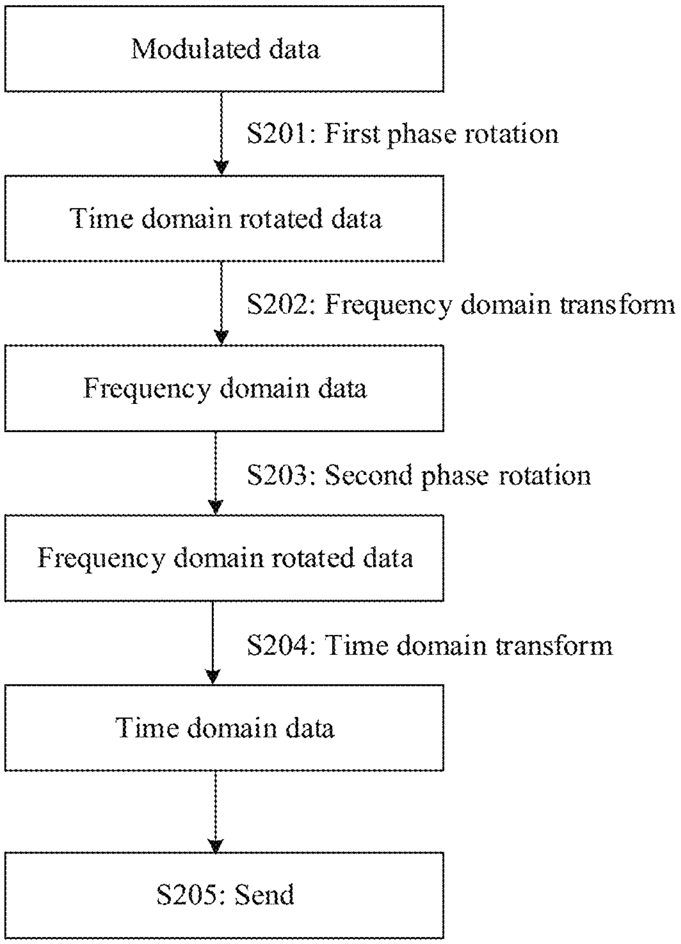
FIG. 2 is a schematic diagram of a data sending method according to an embodiment of this application.

FIG. 2 is a schematic diagram of a data sending method according to an embodiment of this application. As shown in FIG. 2, the data sending method is applied to a terminal device, and the data sending method specifically includes the following steps.

S201: Perform first phase rotation on modulated data to obtain time domain rotated data.

The modulated data may be data obtained by modulating bit data in a modulation manner such as quadrature phase shift keying (quadrature phase shift keying, QPSK) modulation, 16 QAM modulation, or 64 QAM modulation. This is not limited in this embodiment of this application. The bit data may be obtained in various processing manners. For example, processing such as encoding, interleaving, and scrambling may be performed on an original bit stream to obtain the bit stream. The original bit stream may be obtained based on a service to be sent by the terminal device. This is not limited in this embodiment of this application.

Performing the first phase rotation on the modulated data may be: performing phase rotation based on an obtained phase factor corresponding to the first phase rotation. The phase factor is associated with a data length of the modulated data, the phase factor includes a plurality of elements, and the plurality of elements are in a one-to-one correspondence with elements in the modulated data.

For example, the modulated data includes M elements, the phase factor also includes M elements, M is a positive integer, the first element in the modulated data corresponds to the first element in the phase factor, and the second element in the modulated data corresponds to the second element in the phase factor. An element in the phase factor may correspond to an element in the modulated data. Therefore, different elements in the modulated data may correspond to different elements (which may be specifically understood as values) in the phase factor.

The modulated data may be one channel of modulated data, or may be two channels of modulated data. When the modulated data is one channel of modulated data, the first phase rotation is performed on the channel of modulated data. When the modulated data is two channels of modulated data, the first phase rotation is performed on the two channels of modulated data, and phase factors corresponding to phase rotation performed on different channels of modulated data may be the same.

If the modulated data is one channel of modulated data, the channel of modulated data corresponds to one channel of time domain rotated data, one channel of frequency domain data, and one channel of frequency domain rotated data. If the modulated data is two channels of modulated data, the two channels of modulated data correspond to two channels of time domain rotated data, two channels of frequency domain data, and two channels of frequency domain rotated data.

S202: Perform frequency domain transform on the time domain rotated data to obtain frequency domain data.

A method for performing frequency domain transform on the time domain rotated data may be to perform frequency domain transform through Fourier transform (Fourier transform), fast Fourier transform (Fast Fourier Transform, FFT), discrete Fourier transform (Discrete Fourier Transform, DFT), or the like, to obtain the frequency domain data.

S203: Perform second phase rotation on the frequency domain data to obtain frequency domain rotated data.

If the frequency domain data is one channel of frequency domain data, a phase factor corresponding to the frequency domain data may be obtained, and a phase factor corresponding to conjugate data of the frequency domain data may be obtained, and phase rotation is performed on the frequency domain data and the conjugate data based on the phase factor corresponding to the frequency domain data and the phase factor corresponding to the conjugate data of the frequency domain data, to obtain frequency domain rotated data.

If the frequency domain data is two channels of frequency domain data, a phase factor corresponding to each of the two channels of frequency domain data may be separately obtained, phase rotation is performed to obtain each channel of frequency domain rotated data, and each channel of frequency domain rotated data is superposed to obtain final frequency domain rotated data.

S204: Perform time domain transform on the frequency domain rotated data to obtain time domain data.

Performing time domain transform on the frequency domain rotated data may be to perform time domain transform through inverse Fourier transform (Inverse Fourier transform), inverse fast Fourier transform (Inverse Fast Fourier transform, IFFT), inverse discrete Fourier transform (Inverse Discrete Fourier Transform, IDFT), or the like, to obtain the time domain data.

S205: Send the time domain data.

When the time domain data is sent, the time domain data may be sent on one symbol. The terminal device may further send a reference signal by using another symbol. The reference signal is used to assist in channel estimation. An NR method may be used for generating the reference signal. This is not limited. The reference signal may alternatively be generated by using the sending method in this application. Modulated data corresponding to the reference symbol is known to both the terminal device and a network device, and the modulated data corresponding to the reference symbol may be generated by using a pseudo-random sequence.

In this example, the first phase rotation and the second phase rotation are performed on the modulated data, to reduce a maximum amplitude of the time domain data and reduce a PAPR of the sent time domain data.

Figure 3A:
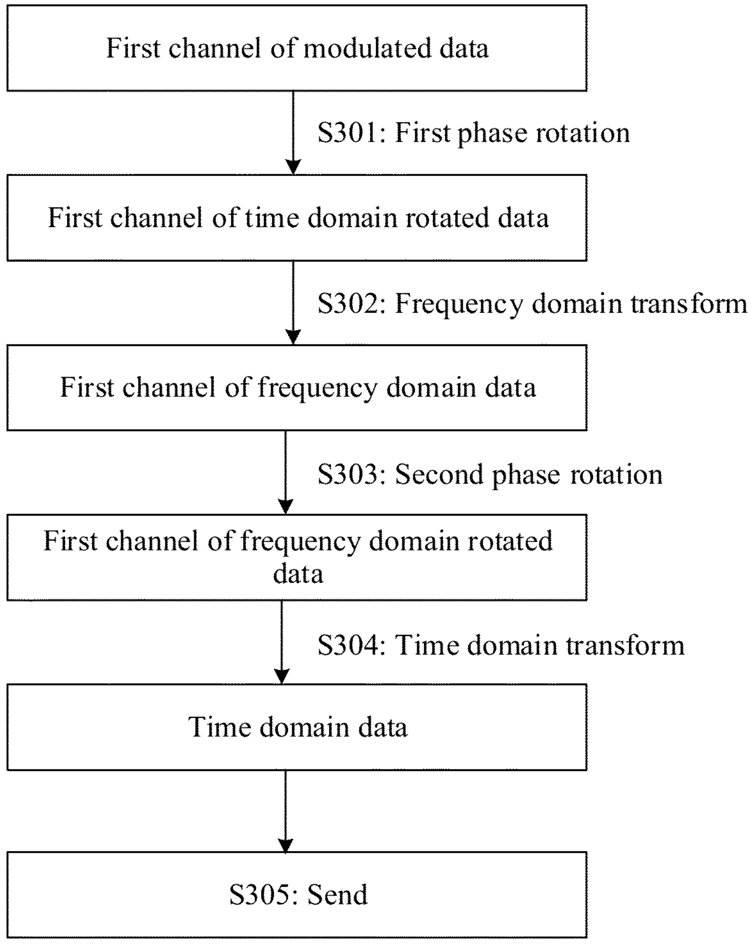
FIG. 3A is a schematic diagram of a data sending method used when modulated data is one channel of modulated data according to an embodiment of this application.

In a possible implementation, FIG. 3A is a schematic diagram of a data sending method used when modulated data is one channel of modulated data. As shown in FIG. 3A, the data sending method includes the following steps.

S301: Perform first phase rotation on a first channel of modulated data to obtain a first channel of time domain rotated data.

For a method for obtaining the first channel of modulated data, refer to the method for obtaining the modulated data in step S201. Details are not described herein again.

In a possible implementation, a first phase factor may be determined based on a first data length of the first channel of modulated data, and after the first phase factor is determined, phase rotation is performed on the first channel of modulated data by using the first phase factor, to obtain the first channel of time domain rotated data. A general phase rotation method may be used to perform phase rotation on the first channel of modulated data.

In an example, the first channel of modulated data may be represented as x, x(m) is an $m^{th}$ element in the first channel of modulated data, the first phase factor is $P_1$, $P_1(m)$ is an $m^{th}$ element in the first phase factor, and x(m) corresponds to $P_1(m)$.

In a possible example, the first phase factor may be determined by using a method shown in the following manner:

$$P_1(m) = e^{-j\frac{\pi}{M}m};$$

$$P_1(m) = e^{-j\left(\frac{\pi}{M}+\frac{\pi}{2}\right)m};$$

$$P_1(m) = e^{-j\left(\frac{\pi}{M}-\frac{\pi}{2}\right)m};$$

$$P_1(m) = e^{j\frac{\pi(M-1)}{M}m};\ \text{or}$$

$$P_1(m) = e^{-j\frac{\pi(M+1)}{M}m},$$

where m is an index value, $P_1(m)$ is an $m^{th}$ element of the first phase factor, j is an imaginary symbol, and M is the first data length.

Certainly, the first phase factor may alternatively be determined in a predefinition manner, and when the first phase factor is predefined, the first phase factor also satisfies the condition shown in the foregoing method. The first phase factor may alternatively be indicated by using signaling.

The first channel of time domain rotated data obtained by performing phase rotation on the first channel of modulated data may be represented as:

$$x^{pre}(m) = x(m) \times P_1(m),\ m = 0, 1, \ldots, M-1$$

$x^{pre}(m)$ is an $m^{th}$ element in the first channel of time domain rotated data $x^{pre}$.

S302: Perform frequency domain transform on the first channel of time domain rotated data to obtain a first channel of frequency domain data.

A method for performing frequency domain transform on the first channel of time domain rotated data may be to perform frequency domain transform through Fourier transform (Fourier transform), fast Fourier transform (Fast Fourier Transform, FFT), discrete Fourier transform (Discrete Fourier Transform, DFT), or the like, to obtain the first channel of frequency domain data.

In a possible example, the first channel of frequency domain data may be represented as X, and may be specifically represented as:

$$X(k) = \frac{1}{\sqrt{M}} \sum_{m=0}^{M-1} x^{pre}(m) \times e^{-j\frac{2\pi mk}{M}},\ k = 0, 1, \ldots, M-1$$

X(k) is a $k^{th}$ element of the frequency domain data X, j is an imaginary symbol, and $x^{pre}(m)$ is an $m^{th}$ element in the first channel of time domain rotated data $x^{pre}$.

Certainly, when frequency domain transform is performed, layer mapping (layer mapping) may alternatively be performed on the first channel of time domain rotated data $x^{pre}$ to obtain data corresponding to each layer (layer), and then Fourier transform is performed on the data corresponding to each layer to obtain frequency domain data X corresponding to the layer.

S303: Perform second phase rotation on the first channel of frequency domain data to obtain a first channel of frequency domain rotated data.

A phase factor corresponding to the first channel of frequency domain data may be obtained, and a phase factor corresponding to conjugate data of the first channel of frequency domain data may be obtained. The phase factor corresponding to the first channel of frequency domain data may be represented as $P^{post}$, and the phase factor corresponding to the conjugate data of the first channel of frequency domain data may be represented as $P^{post,conj}$.

Rotation data obtained by performing phase rotation on the first channel of frequency domain data based on the phase factor corresponding to the first channel of frequency domain data and rotated data obtained by performing phase rotation on the conjugate data of the first channel of frequency domain data based on the phase factor corresponding to the conjugate data of the first channel of frequency domain data are added to obtain the first channel of frequency domain rotated data.

In a possible example, the first channel of frequency domain rotated data may be represented as $X^{post}(k)$, and may be specifically represented as:

$$X^{post}(k) = \frac{1}{2} X(k) \times P^{post}(k) + \frac{1}{2}[X(M-1-k)]^* \times P^{post,conj}(k)$$

$P^{post}(k)$ is a $k^{th}$ element of the phase factor $P^{post}$, $P^{post,conj}(k)$ is a $k^{th}$ element of the phase factor $P^{post,conj}$, where k=0, 1, . . . , M−1, X(k) is a $k^{th}$ element of the first channel of frequency domain data X, and $(A)^*$ indicates that a conjugate operation is performed on A, that is, $[X(M-1-k)]^*$ is conjugate data corresponding to an $M-1-k^{th}$ element (that is, X(M−1−k)) of the first channel of frequency domain data X.

The phase factor corresponding to the first channel of frequency domain data and the phase factor corresponding to the conjugate data of the first channel of frequency domain data may be determined based on a data length of the first channel of frequency domain data. The data length of the first channel of frequency domain data may be the same as the first data length. Therefore, the phase factor corresponding to the first channel of frequency domain data and the phase factor corresponding to the conjugate data of the first channel of frequency domain data may be determined based on the first data length. Details may be as follows:

$$P^{post}(k) = 1 + e^{-j\frac{\pi}{M}k} e^{-j\frac{\pi(M+1)}{2M}} \text{ and } P^{post,conj}(k) = 1 - e^{-j\frac{\pi}{M}k} e^{-j\frac{\pi(M+1)}{2M}};$$

$$P^{post}(k) = e^{-j\frac{\pi}{M}k} + e^{-j\frac{\pi(M+1)}{2M}} \text{ and } P^{post,conj}(k) = e^{-j\frac{\pi}{M}k} - e^{-j\frac{\pi(M+1)}{2M}};$$

$$P^{post}(k) = 1 + e^{-j\frac{\pi}{M-1}k} e^{-j\frac{\pi}{2}} \text{ and } P^{post,conj}(k) = 1 - e^{-j\frac{\pi}{M-1}k} e^{-j\frac{\pi}{2}};\ \text{or}$$

$$P^{post}(k) = 1 + e^{-j\frac{\pi}{M+1}k} e^{-j\frac{\pi(M+3)}{2(M+1)}} \text{ and } P^{post,conj}(k) = 1 - e^{-j\frac{\pi}{M+1}k} e^{-j\frac{\pi(M+3)}{2(M+1)}}$$

It is easily learned from the phase factors shown above that different elements k may correspond to different amplitudes of the phase factor $P^{post}(k)$ and different amplitudes of the phase factor $P^{post,conj}(k)$. Therefore, when $P^{post}(k)$ and X(k) are multiplied, both an amplitude and a phase of X(k)

are changed; and when $P^{post,conj}(k)$ and $[X(M-1-k)]^*$ are multiplied, both an amplitude and a phase of $[X(M-1-k)]^*$ are changed.

In another implementation, a phase factor $$P_0^{post}$$

and a phase factor $$P_1^{post}$$

may be defined. In this case, a relationship among the phase factor $P^{post}$ and the phase factor $P^{post,conj}$ in the second phase rotation, $$P_0^{post}\text{, and } P_1^{post}$$

may be represented as:

$$P^{post}(k) = P_0^{post}(k) + P_1^{post}(k) \text{ and } P^{post,conj}(k) = P_0^{post}(k) - P_1^{post}(k)$$

Therefore, values of $P^{post}(k)$ and $P^{post,conj}(k)$ may be determined by determining values of $$P_0^{post}(k) \text{ and } P_1^{post}(k).$$

A possible method for obtaining values of $$P_0^{post}(k) \text{ and } P_1^{post}(k)$$

is as follows:

$$P_0^{post}(k) = e^{j\pi\theta_0 k}e^{j\pi\omega_o} \text{ and } P_1^{post}(k) = e^{j\pi\theta_1 k}e^{j\pi\omega_1}$$

$$\omega_1 - \omega_0 = -\frac{1}{2}(\theta_1 - \theta_0)(M-1) + p$$

is satisfied. p is any integer.

Because any three of parameters $\omega_1$, $\omega_0$, $\theta_1$, and $\theta_0$ are determined, a remaining parameter value may be determined. For values of the parameters $\omega_1$, $\omega_0$, $\theta_1$, and $\theta_0$, a possible value obtaining manner is: $\theta_0=0$ and $\omega_0=0$;

$$P_0^{post}(k) = 1 \text{ and } P_1^{post}(k) = e^{j\pi\theta_1 k}e^{j\pi\omega_1};$$

$$\omega_1 = -\frac{1}{2}\theta_1(M-1) + p$$

Therefore, the value of $\omega_1$ may be uniquely determined by determining the value of $\theta_1$.

In a possible implementation (it is assumed that p=0), $$\theta_1 = -\frac{1}{M} \text{ and } \omega_1 = \frac{M-1}{2M}\text{; that is,}$$

$$P_0^{post}(k) = 1 \text{ and } P_1^{post}(k) = e^{-j\frac{\pi}{M}k}e^{j\frac{\pi(M-1)}{2M}};$$

$$\theta_1 = -\frac{1}{M-1} \text{ and } \omega_1 = \frac{1}{2}\text{; that is,}$$

$$P_0^{post}(k) = 1 \text{ and } P_1^{post}(k) = e^{-j\frac{\pi}{M-1}k}e^{j\frac{\pi}{2}};$$

$$\theta_1 = -\frac{1}{M+1} \text{ and } \omega_1 = \frac{(M-1)}{2(M+1)}\text{; that is,}$$

$$P_0^{post}(k) = 1 \text{ and } P_1^{post}(k) = e^{-j\frac{\pi}{M+1}k}e^{j\frac{\pi(M-1)}{2(M+1)}};$$

$$\theta_1 = -\frac{2}{3M} \text{ and } \omega_1 = \frac{(M-1)}{3M}\text{; that is,}$$

$$P_0^{post}(k) = 1 \text{ and } P_1^{post}(k) = e^{-j\frac{2\pi}{3M}k}e^{j\frac{\pi(M-1)}{3M}}\text{; or}$$

$$\theta_1 = -\frac{3}{2M} \text{ and } \omega_1 = \frac{3(M-1)}{4M}\text{; that is,}$$

$$P_0^{post}(k) = 1 \text{ and } P_1^{post}(k) = e^{-j\frac{3\pi}{2M}k}e^{j\frac{3\pi(M-1)}{4M}}$$

In a possible implementation, $\theta_1=0$ and $\omega_0=0$;

$$P_0^{post}(k) = e^{j\pi\theta_0 k} \text{ and } P_1^{post}(k) = e^{j\pi\omega_1};$$

$$\omega_1 = \frac{1}{2}\theta_0(M-1) + p$$

Therefore, the value of $\omega_1$ may be uniquely determined by determining the value of $\theta_0$.

In a possible example (it is assumed that p=0), $$\theta_0 = \frac{1}{M} \text{ and } \omega_1 = \frac{M-1}{2M}\text{; that is,}$$

$$P_0^{post}(k) = e^{j\frac{\pi}{M}k} \text{ and } P_1^{post}(k) = e^{j\frac{\pi(M-1)}{2M}}\text{; or}$$

$$\theta_0 = \frac{1}{M-1} \text{ and } \omega_1 = \frac{1}{2}\text{; that is, } P_0^{post}(k) = e^{j\frac{\pi}{M-1}k} \text{ and } P_1^{post}(k) = e^{j\frac{\pi}{2}}$$

S304: Perform time domain transform on the first channel of frequency domain rotated data to obtain time domain data.

Performing time domain transform on the first channel of frequency domain rotated data may be to perform time domain transform through inverse Fourier transform (inverse Fourier transform), inverse fast Fourier transform (inverse Fast Fourier transform, IFFT), inverse discrete Fourier transform (inverse Discrete Fourier Transform, IDFT), or the like, to obtain the time domain data.

In a possible example, the time domain data may be represented as s(t), and may be specifically represented as:

$$s(t) = \frac{1}{\sqrt{N_{scale}^{ifft}}}\sum_{k=k_{sc}^{start}}^{k_{sc}^{end}} X^{post}\left(k - k_{sc}^{start}\right)e^{j2\pi\times\Delta f\times(k+k_{offset})\times(t+t_{offset})}$$

s(t) is data of the time domain data s at a $t^{th}$ moment, where $t_{start} \le t < t_{end}$, $t_{start}$, t, and $t_{end}$ are real numbers, $t_{start}$ is a start moment, $t_{end}$ is an end moment, $t_{end}-t_{start}=(N+N_{cp})T_s$. For example, $t_{start}=0$ and $t_{end}=(N+N_{cp})T_s$. N is a positive integer, for example, N=2048, and $N_{cp}T_s$ is a time length of a cyclic prefix. $\Delta f$ is a subcarrier spacing, for example, $\Delta f=1/(NT_s)$. $T_s$ is a time unit factor, and may be preconfigured, or may be notified by a network device to a terminal device by using signaling.

Optionally, $T_s$ may be a time interval between two adjacent pieces of discrete data in discrete data obtained by performing discrete sampling on the time domain data s(t). $t_{offset}$ is a delay offset, and a value of $t_{offset}$ may be preconfigured, for example, $t_{offset}=-N_{cp}T_s$. Alternatively, a value of $t_{offset}$ may be notified by the network device to the terminal device by using signaling.

$$N_{scale}^{ifft}$$

is a coefficient for adjusting an output data power by inverse Fourier transform, for example, $$N_{scale}^{ifft}=1.\ k_{offset}$$

is a frequency domain offset factor, and a value of $k_{offset}$ may be preconfigured, for example, $k_{offset}=\frac{1}{2}$. Alternatively, a value of $k_{offset}$ may be notified by the network device to the terminal device by using signaling.

$$k_{sc}^{start}$$

is an index of a start location of a frequency domain resource to which frequency domain rotated data $X^{post}$ is mapped, and $$k_{sc}^{end}$$

is an index of an end location of the frequency domain resource to which the frequency domain rotated data is mapped, where $$k_{sc}^{end}-k_{sc}^{start}=M-1.$$

The index of the start location and the index of the end location of the frequency domain resource may be respectively a start location and an end location of a subcarrier corresponding to an allocated bandwidth.

In a possible example, if $t_{start}=0$, $t_{end}=(N+N_{cp})T_s$, and $t_{offset}=-N_{cp}T_s$, a time length of the time domain data s is $(N+N_{cp})T_s$, where data of a start time length $N_{cp}T_s$ may be considered as a cyclic prefix of the time domain data s. Data of a remaining time length $NT_s$ other than the data of the start time length $N_{cp}T_s$ may be considered as time domain data without the cyclic prefix.

It should be noted that, alternatively, precoding (precoding) and resource mapping may be first performed on the frequency domain rotated data $X^{post}$, and then inverse Fourier transform is performed to obtain the time domain data. For precoding, refer to section 6.3.1.5 in 3GPP TS 38.211 V15.8.0. For resource mapping, refer to section 6.3.1.6 and section 6.3.1.7 in 3GPP TS 38.211 V15.8.0. This is not limited in this application.

S305: Send the time domain data.

The terminal device sends the time domain data on one symbol, that is, the modulated data of a length M and the frequency domain data X correspond to a symbol on which the time domain data is located. In other words, the modulated data is sent on the symbol. The terminal device may send the time domain data on a plurality of symbols. The terminal device may first determine modulated data of the plurality of symbols, determine modulated data of each symbol from the modulated data of the plurality of symbols, and then obtain time domain data of each symbol by using the foregoing method.

The terminal device may send a reference signal on a part of the plurality of symbols. The reference signal is known to both the terminal device and a base station device, and may be used to assist in channel estimation. For a method for generating and sending a reference signal, refer to an NR system. This is not limited in this embodiment. The reference signal may alternatively be generated by using the sending method in this application. Modulated data corresponding to the reference symbol is known to both the terminal device and the network device, and the modulated data corresponding to the reference symbol may be generated by using a pseudo-random sequence.

In a possible embodiment, if a data length of the first channel of frequency domain rotated data obtained through the second phase rotation is greater than the data length of the first channel of modulated data, time domain transform may be performed on the first channel of frequency domain rotated data in the following manner to obtain the time domain data:

filtering the first channel of frequency domain rotated data to obtain filtered data; and performing time domain transform on the filtered data to obtain the time domain data.

A length of the filtered data obtained by filtering the first channel of frequency domain rotated data is Q, and the length is greater than the length of the first channel of modulated data.

In a specific example, it is assumed that the data length of the first channel of frequency domain rotated data obtained through the second phase rotation is 2M, and the data length of the first channel of frequency domain data is M, that is, the data length of the first channel of frequency domain rotated data is twice that of the first channel of frequency domain data. In this case, the following relationship exists between the first channel of frequency domain rotated data and the first channel of frequency domain data X:

$$X^{post}(k)=\begin{cases}\frac{1}{2}X(k)\times P^{post}(k)+ & 0\le k<M\\ \frac{1}{2}[X(M-1-k)]^{*}\times P^{post,conj}(k), & \\ \frac{1}{2}X(k-M)\times P^{post,conj}(k-M)+ & M\le k<2M\\ \frac{1}{2}[X(2M-1-k)]^{*}\times P^{post}(k-M), & \end{cases},\text{ or}$$

$$X^{post}(k)=\begin{cases}\frac{1}{2}X(k)\times P^{post}(k)+ & 0\le k<M\\ \frac{1}{2}[X(M-1-k)]^{*}\times P^{post,conj}(k), & \\ \frac{1}{2}X(k\bmod M)\times P^{post,conj}(k\bmod M)+ & M\le k<2M\\ \frac{1}{2}[X(M-1-k\bmod M)]^{*}\times P^{post}(k\bmod M), & \end{cases}$$

mod indicates a modulo operation.

In a specific example, it is assumed that the data length of the first channel of frequency domain rotated data obtained through the second phase rotation is 2M, and the data length of the first channel of frequency domain data is M, that is, the data length of the first channel of frequency domain rotated data is twice that of the first channel of frequency domain data, and in addition, the phase rotation factors have the following relational expressions:

$$P^{post}(k)=P_0^{post}(k)+P_1^{post}(k)$$

$$P^{post,conj}(k)=P_0^{post}(k)-P_1^{post}(k)$$

In this case, the following relationship may also exist between the first channel of frequency domain rotated data and the first channel of frequency domain data X:

$$X^{post}(k)=\begin{cases}\frac{1}{2}X(k)\times\left[P_0^{post}(k)+P_1^{post}(k)\right]+ & 0\le k<M\\ \frac{1}{2}[X(M-1-k)]^*\times\left[P_0^{post}(k)-P_1^{post}(k)\right], & \\ \frac{1}{2}X(k')\times\left[P_0^{post}(k')-P_1^{post}(k')\right]+ & M\le k<2M\\ \frac{1}{2}[X(M-1-k')]^*\times\left[P_0^{post}(k')+P_1^{post}(k')\right], & \end{cases},$$

where $$k'=k-M,\ k'=0,1,\ \dots\ ,M-1$$

$$X^{post}(k)=\begin{cases}\frac{1}{2}X(k)\times\left[P_0^{post}(k)+P_1^{post}(k)\right]+ & 0\le k<M\\ \frac{1}{2}[X(M-1-k)]^*\times\left[P_0^{post}(k)-P_1^{post}(k)\right], & \\ \frac{1}{2}X(k-M)\times\left[P_0^{post}(k-M)-P_1^{post}(k-M)\right]+ & M\le k<2M\\ \frac{1}{2}[X(2M-1-k)]^*\times\left[P_0^{post}(k-M)+P_1^{post}(k-M)\right], & \end{cases};$$

or $$X^{post}(k)=\begin{cases}\frac{1}{2}X(k)\times\left[P_0^{post}(k)+P_1^{post}(k)\right]+ & 0\le k<M\\ \frac{1}{2}[X(M-1-k)]^*\times\left[P_0^{post}(k)-P_1^{post}(k)\right], & \\ \frac{1}{2}X(k\bmod M)\times\left[P_0^{post}(k\bmod M)-P_1^{post}(k\bmod M)\right]+ & M\le k<2M\\ \frac{1}{2}[X(M-1-k\bmod M)]^*\times & \\ \left[P_0^{post}(k\bmod M)+P_1^{post}(k\bmod M)\right], & \end{cases},$$

In a possible implementation, the relationship between the frequency domain rotated data $X^{post}$ and the frequency domain data X may alternatively be represented as:

$$X^{post}(k)=\frac{1}{2}X(k)\times\left[P_0^{post}(k\bmod M)+e^{j\pi\lfloor k/M\rfloor}P_1^{post}(k\bmod M)\right]+\frac{1}{2}[X(M-1-k\bmod M)]^*\times\left[P_0^{post}(k\bmod M)-e^{j\pi\lfloor k/M\rfloor}P_1^{post}(k\bmod M)\right],$$

where $0\le k<2M$, and mod indicates a modulo operation.

Frequency domain filtering is performed on the frequency domain rotated data $X^{post}$ of a length 2M to obtain filtered data $X^{filter}$ of a length Q. M≤Q≤2M, and Q is a positive integer. Specifically, the filtered data may be represented as:

$$X^{filter}\left(k+k_{offset}^{filter}\right)=X^{post}\left(k+k_{offset}^{filter}\right)\times S^{filter}\left(k+k_{offset}^{filter}\right),\ k=0,1,\ \dots\ ,Q-1$$

$S^{filter}$ is a coefficient of a filter, and $S^{filter}$ includes 2M elements.

$$k_{offset}^{filter}$$

is an offset factor.

$$k_{offset}^{filter}$$

is a positive integer, and may be predefined, for example, $$k_{offset}^{filter}=(M-Q/2).$$

A coefficient of a filter may be a common frequency domain coefficient of a filter, for example, a frequency domain coefficient of a filter such as a square root raised cosine (Square Root Raised Cosine, SRRC) filter or a root raised cosine (Root Raised Cosine, RRC) filter. When the filter is the square root raised cosine (Square Root Raised Cosine, SRRC) filter, a roll-off factor (roll-off factor) of the filter is $$\frac{2Q}{M}-1.$$

In this case, amplitudes of middle Q elements in 2M coefficients of the corresponding filter are relatively high, and amplitudes of remaining 2M−Q elements may be ignored. Therefore, only middle Q values may be used for frequency domain filtering.

Inverse Fourier transform is performed on the filtered data $X^{filter}$ of the length Q is to obtain time domain data, and the terminal device sends the time domain data.

Optionally, a cyclic shift may be further performed on the first channel of frequency domain rotated data $X^{post}$ of the length is 2M, to obtain shift data $$X_{shift}^{post}$$

of a length 2M; filtering is performed on the shift data to obtain filtered data; and time domain is performed on the filtered data to obtain time domain data. Performing a cyclic shift on the first channel of frequency domain data may be represented as:

$$X_{shift}^{post}(k)=X^{post}\left[\left(k+k_{offset}^{shift}\right)\bmod 2M\right],\ k=0,1,\ \dots\ ,2M-1$$

$$k_{offset}^{shift}$$

is a shift factor of the cyclic shift, is an integer, and may be predefined. For example, $$k_{offset}^{shift} = -M/2.$$

It should be noted that the second phase rotation operation and the cyclic shift may be represented by using a same expression. For example, when $$k_{offset}^{shift} = -M/2,$$

shift data $$X_{shift}^{post}$$

obtained by performing the second phase rotation and the cyclic shift on the frequency domain data X of the length M may be represented as:

$$X_{shift}^{post}(k)\begin{cases} \frac{1}{2}X(k+M/2)\times P^{post.conj}(k+M/2)+ & 0\le k<M/2 \\ \frac{1}{2}[X(M/2-1-k)]^*\times P^{post}(k+M/2) & \\ \frac{1}{2}X(k+M/2)\times P^{post}(k+M/2)+ & M/2\le k<3M/2 \\ \frac{1}{2}[X(3M/2-1-k)]^*\times P^{post.conj}(k-M/2), & \\ \frac{1}{2}X(k-3M/2)\times P^{post.conj}(k+3M/2)+ & 3M/2\le k<2M \\ \frac{1}{2}[X(5M/2-1-k)]^*\times P^{post}(k-3M/2) & \end{cases}$$

Frequency domain filtering is performed on the shift data $$X_{shift}^{post}$$

of a length 2M to obtain filtered data $X^{filter}$ of a length Q. For details, refer to the filtering method in the foregoing embodiment.

Optionally, the relationship between the first channel of frequency domain rotated data $X^{post}$ of the length 2M and the frequency domain data X of the length M may be represented as:

$$X^{post}(k) = \frac{1}{2}X(k \bmod M)\times P^{post}(k \bmod M) + \frac{1}{2}[X(M-1-k \bmod M)]^*\times P^{post,conj}(k \bmod M),$$

$$\text{where } k = 0, 1, \ldots, 2M-1.$$

In a possible implementation, when a modulation scheme of the first channel of modulated data is BPSK modulation, the first phase factor may be 1, that is, first phase modulation is not performed on the first channel of modulated data. In this case, the first channel of frequency domain data X is obtained by performing Fourier transform on BPSK modulated data x of a length M. The data length of the first channel of frequency domain rotated data is twice the data length of the first channel of modulated data, and the relationship between the first channel of frequency domain rotated data $X^{post}$ and the first frequency domain data X may be represented according to the following formula:

$$X^{post}(k) = H_{scale}\times X(k\bmod M)\left[1 + j\times e^{j\frac{\pi k}{M}}\right], k = 0, 1, \ldots, 2M-1;$$

$$X^{post}(k) = H_{scale}\times X(k\bmod M)\left[1 - j\times e^{j\frac{\pi k}{M}}\right], k = 0, 1, \ldots, 2M-1;$$

$$X^{post}(k) = H_{scale}\times X(k\bmod M)\left[1 + j\times e^{-j\frac{\pi k}{M}}\right], k = 0, 1, \ldots, 2M-1; \text{ or}$$

$$X^{post}(k) = H_{scale}\times X(k\bmod M)\left[1 - j\times e^{-j\frac{\pi k}{M}}\right], k = 0, 1, \ldots, 2M-1$$

$H_{scale}$ is a power factor, and $H_{scale}$ is a real number. For example, $H_{scale}=1/\sqrt{2}$.

For a specific implementation of filtering the first channel of frequency domain rotated data to obtain filtered data, refer to the manner shown in the foregoing embodiment. Details are not described herein again.

Figure 3B:
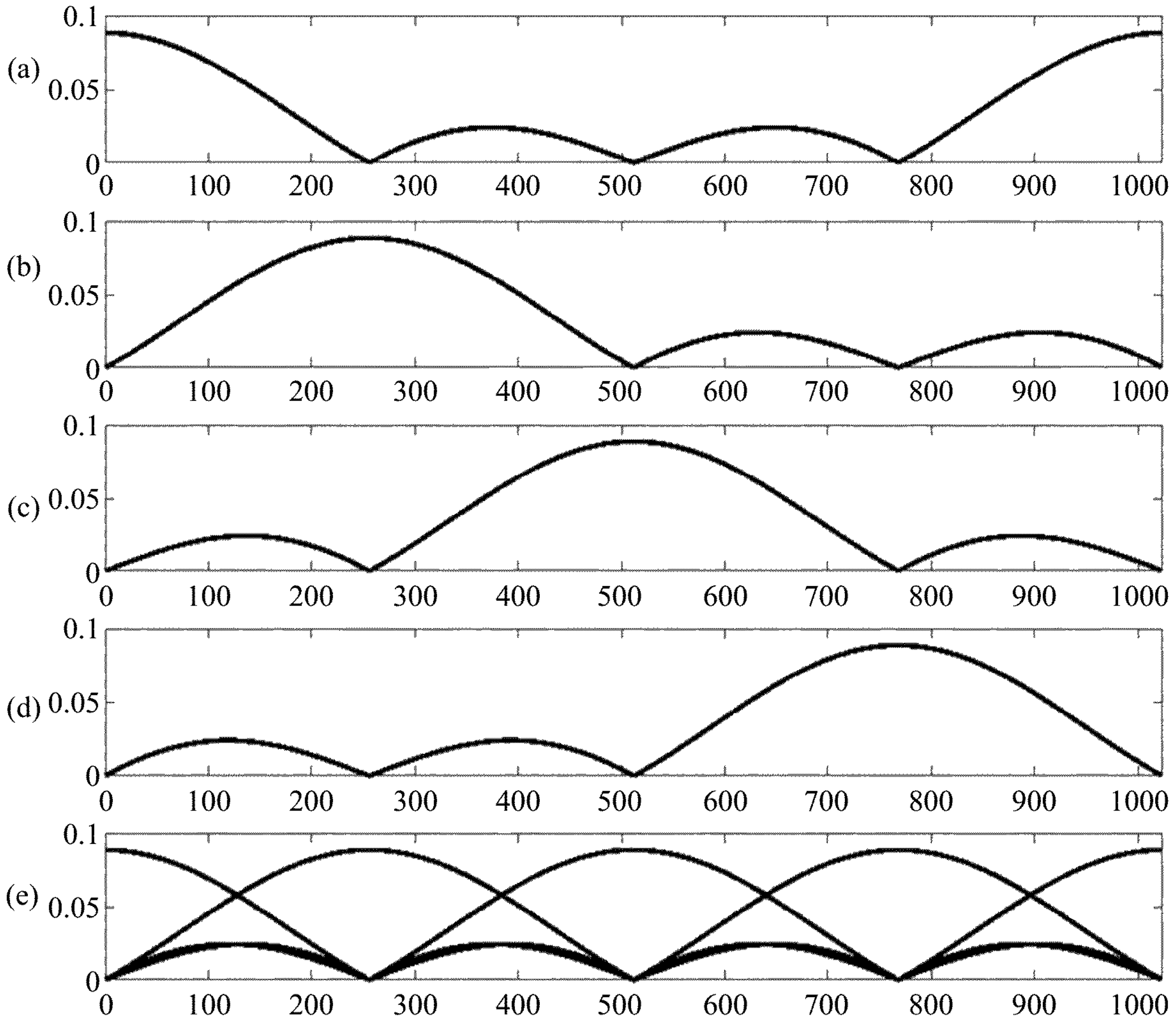
FIG. 3B is a schematic diagram of processing modulated data by using a conventional SC-FDMA waveform according to an embodiment of this application.

FIG. 3B is a schematic diagram of processing modulated data by using a conventional SC-FDMA waveform. As shown in FIG. 3B, time domain data of an SC-FDMA waveform may be approximately considered to be obtained by superposing each piece of modulated data after oversampling is performed by using a SINC function. In this example, an example in which modulated data x includes four elements is used for description. The four elements may be represented as [x(0), x(1), x(2), x(3)].

Time domain data of an SC-FDMA waveform generated by the modulated data x may be obtained by adding time domain data of an SC-FDMA waveform generated based on each of four groups of modulated data [x(0), 0, 0, 0], [0, x(1), 0, 0], [0, 0, x(2), 0], and [0, 0, 0, x(3)]. Specifically, as shown in FIG. 3B, a horizontal coordinate in FIG. 3B is an index of discrete time domain data. In FIG. 3B, it is assumed that a quantity of points of inverse Fourier transform is N=1024, and a vertical coordinate is an amplitude. (a), (b), (c), and (d) in FIG. 3B respectively correspond to the time domain data of the SC-FDMA waveform generated based on the four groups of modulated data [x(0), 0, 0, 0], [0, x(1), 0, 0], [0, 0, x(2), 0], and [0, 0, 0, x(3)]. An example in which time domain data of an SC-FDMA waveform generated based on the modulated data [x(0), 0, 0, 0] is used. It may be considered that the time domain data is obtained by performing a dot product between the modulated data x(0) and the SINC function, that is, a plurality of values are obtained by oversampling one piece of modulated data x(0) by using the SINC function.

(e) in FIG. 3B is a schematic diagram of representing, in one coordinate, the time domain data of the SC-FDMA waveform corresponding to the four groups of modulated data. A value of the time domain data of the SC-FDMA waveform corresponding to the modulated data x at a position of an index may be obtained by adding a plurality of values of the same index. As shown in (e) in FIG. 3B, in a conventional SC-FDMA waveform, time domain data corresponding to different modulated data may be superposed in a same direction. As a result, a peak value is large.

Therefore, in this application, phase rotation is performed on each element in the modulated data x, and in addition, phase rotation is performed on first frequency domain data, so that a superposition effect of time domain data corresponding to different modulated data can be improved, and a maximum value of time domain data obtained through superposition is reduced, thereby reducing a PAPR. In addition, although operations of the first phase rotation and the second phase rotation are introduced in this embodiment, increased complexity is small relative to a conventional SC-FDMA waveform.

In addition, the first phase factor and the second phase factor are determined by using the method in this application, so that there is no interference between different elements of first modulated data demodulated by a receiver and between a real part and an imaginary part of a same element, to avoid a demodulation performance loss.

Figure 4:
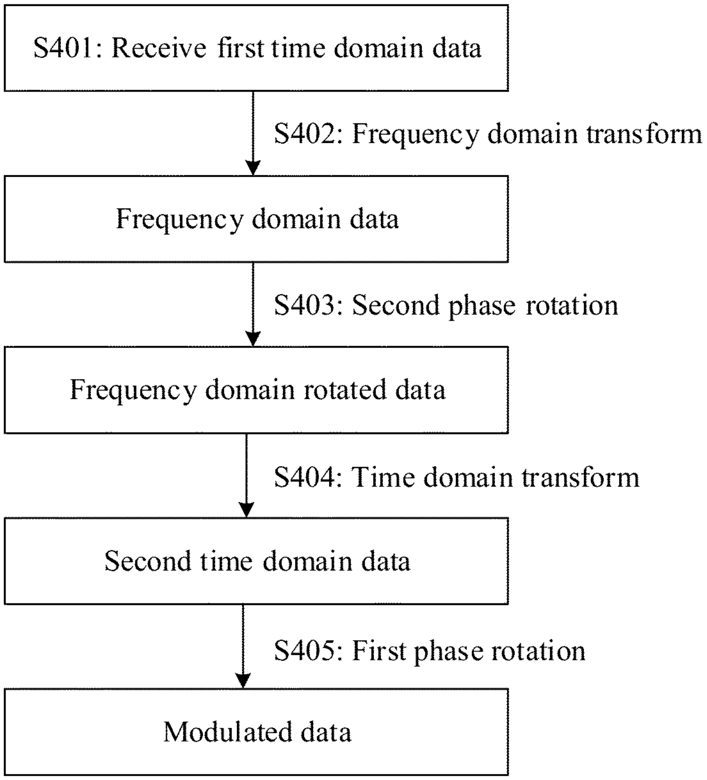
FIG. 4 is a schematic diagram of a data receiving method according to an embodiment of this application.

FIG. 4 is a schematic diagram of a data receiving method according to an embodiment of this application. As shown in FIG. 4, the method is applied to a network device, and the data receiving method includes the following steps.

S401: Receive first time domain data.

The first time domain data includes time domain data sent by a terminal device, and the first time domain data further includes a reference signal and the like. The first time domain data may be received by a receiver of the network device or the like. A data length of the first time domain data is the same as a data length of the time domain data sent by the terminal device.

S402: Perform frequency domain transform on the first time domain data to obtain frequency domain data.

A method for performing frequency domain transform on the first time domain rotated data may be to perform frequency domain transform through Fourier transform (Fourier transform), fast Fourier transform (Fast Fourier Transform, FFT), discrete Fourier transform (Discrete Fourier Transform, DFT), or the like, to obtain the frequency domain data.

The network device may further receive a reference signal sent by the terminal device, where the reference signal may be included in the first time domain data, perform channel estimation by using the reference signal, to obtain a channel response of a symbol on which the reference signal is located, and obtain, by performing an operation such as interpolation (interpolation) based on the channel response of the symbol on which the reference signal is located, a channel response of a symbol on which the data is located. A base station device performs equalization by using the channel response of the symbol on which the data is located and the frequency domain data, to obtain equalized frequency domain data. In this example, the equalized frequency domain data is denoted as $Y^{post}$. The frequency domain data in subsequent steps is the equalized frequency domain data.

S403: Perform second phase rotation on the frequency domain data to obtain frequency domain rotated data.

The network device obtains a phase factor corresponding to the frequency domain data, and obtains a phase factor corresponding to conjugate data of the frequency domain data. For a specific method for obtaining the phase factor corresponding to the frequency domain data and obtaining the phase factor corresponding to the conjugate data of the frequency domain data, refer to the obtaining method in the foregoing embodiment. Details are not described herein again.

In a possible implementation, a conjugate value of the phase factor corresponding to the frequency domain data is obtained, and phase rotation is performed on the frequency domain data based on the conjugate value to obtain rotated data. A conjugate value of the phase factor corresponding to the conjugate data of the frequency domain data is obtained, and phase rotation is performed on the conjugate data of the frequency domain data based on the conjugate value to obtain rotated data. The rotated data corresponding to the frequency domain data is added to the rotated data corresponding to the conjugate data of the frequency domain data to obtain the frequency domain rotated data.

S404: Perform time domain transform on the frequency domain rotated data to obtain second time domain data.

Performing time domain transform on the frequency domain rotated data may be to perform time domain transform through inverse Fourier transform (inverse Fourier transform), inverse fast Fourier transform (inverse Fast Fourier transform, IFFT), inverse discrete Fourier transform (inverse Discrete Fourier Transform, IDFT), or the like, to obtain the second time domain data.

S405: Perform first phase rotation on the second time domain data to obtain modulated data.

A first phase factor corresponding to the second time domain data may be obtained. For a method for obtaining the phase factor, refer to the method for obtaining the first phase factor corresponding to the first phase rotation in the foregoing embodiment. Details are not described herein again.

A conjugate value of the first phase factor is obtained based on the first phase factor, and phase rotation is performed on the second time domain data based on the conjugate value to obtain the modulated data. A specific phase rotation method may be a phase rotation method in an existing solution, or the like.

Figure 5A:
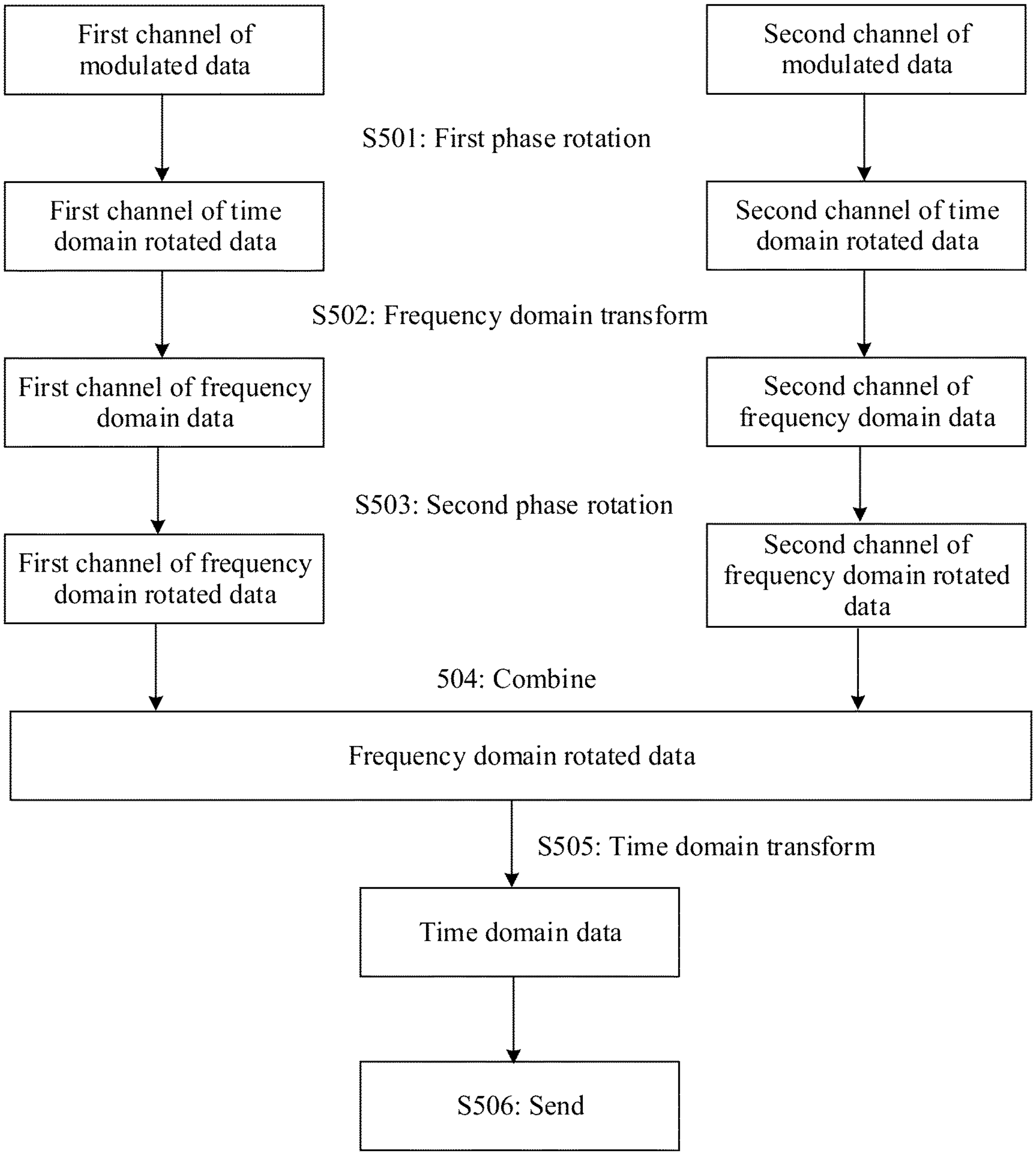
FIG. 5A is a schematic diagram of another data sending method according to an embodiment of this application.

FIG. 5A is a schematic diagram of another data sending method according to an embodiment of this application. As shown in FIG. 5A, modulated data includes a first channel of modulated data and a second channel of modulated data, and the data sending method includes the following steps.

S501: Perform first phase rotation on the first channel of modulated data to obtain a first channel of time domain rotated data, and perform first phase rotation on the second channel of modulated data to obtain a second channel of time domain rotated data.

A first phase factor is determined based on a first data length of the first channel of modulated data, and after the first phase factor is determined, phase rotation is performed on the first channel of modulated data by using the first phase factor, to obtain the first channel of time domain rotated data.

A second phase factor is determined based on a second data length of the second channel of modulated data, and after the second phase factor is determined, phase rotation is performed on the second channel of modulated data by using the second phase factor, to obtain the second channel of time domain rotated data.

The data length of the first channel of modulated data may be the same as the data length of the second channel of modulated data. In this case, the first phase factor and the second phase factor may be determined based on the first data length. The following descriptions use an example in which the data length of the first channel of modulated data is the same as the data length of the second channel of modulated data.

The first phase rotation is performed on the first channel of modulated data to obtain the first channel of time domain rotated data, which may be represented as:

$$x_1^{pre}(m) = x_1(m) \times P_1(m),$$
$$m = 0, 1, \ldots, M-1$$

$$x_1^{pre}(m)$$

is an $m^{th}$ element of the first channel of time domain rotated data $$x_1^{pre},$$

$x_1(m)$ is an $m^{th}$ element of the first channel of modulated data $x_1$, and $P_1(m)$ is an $m^{th}$ element of the first phase factor $P_1$.

The first phase rotation is performed on the second channel of modulated data to obtain the second channel of time domain rotated data, which may be represented as:

$$x_2^{pre}(m) = x_2(m) \times P_2(m),$$
$$m = 0, 1, \ldots, M-1$$

$$x_2^{pre}(m)$$

is an $m^{th}$ element of the second channel of time domain rotated data $$x_2^{pre},$$

$x_2(m)$ is an $m^{th}$ element of the second channel of modulated data $x_2$, and $P_2(m)$ is an $m^{th}$ element of the second phase factor $P_2$.

When the first phase factor of is the same as the second phase factor, for a method for determining the first phase factor based on the first data length, refer to the method for determining the first phase factor (that is, $P_1$) in step S301 of the foregoing embodiment. For a method for determining the second phase factor based on the second data length, refer to the method for determining the first phase factor.

The first channel of modulated data and the second channel of modulated data may use binary phase shift keying (binary phase shift keying, BPSK) modulation, QPSK modulation, 16 QAM modulation, 64 QAM, or the like. The first channel of modulated data is a real number, or the first channel of modulated data is an imaginary number; and the second channel of modulated data is a real number, or the second channel of modulated data is an imaginary number. For example, when the first channel of modulated data is the real number, the first channel of modulated data may be a real part of QPSK modulated data.

S502: Perform frequency domain transform on the first channel of time domain rotated data to obtain a first channel of frequency domain data, and perform frequency domain transform on the second channel of time domain rotated data to obtain a second channel of frequency domain data.

A method for performing frequency domain transform on the first channel of time domain rotated data and the second channel of time domain rotated data may be to perform frequency domain transform through Fourier transform (Fourier transform), fast Fourier transform (Fast Fourier Transform, FFT), discrete Fourier transform (Discrete Fourier Transform, DFT), or the like, to obtain the first channel of frequency domain data and the second channel of frequency domain data.

It is easily learned that, after frequency domain transform is performed on the time domain data (or the modulated data), a data length of the frequency domain data is the same as a data length of the time domain data (or the modulated data).

S503: Perform second phase rotation on the first channel of frequency domain data to obtain a first channel of frequency domain rotated data, and perform second phase rotation on the second channel of frequency domain data to obtain a second channel of frequency domain rotated data.

A third phase factor may be determined based on the first data length, where the third phase factor corresponds to the first channel of frequency domain data, and the fourth phase factor is determined based on the second data length, where the fourth phase factor corresponds to the second channel of frequency domain data.

In a possible example, if the first phase factor $P_1$ is the same as the second phase factor $P_2$, the third phase factor may be determined by using a method shown in the following formula:

$$P_3(k) = e^{j\pi\theta_0 k} e^{j\pi\omega_0}$$

$P_3(k)$ is a $k^{th}$ element of the third phase factor, and $\theta_0$ and $\omega_0$ are constants related to the first data length M.

The fourth phase factor is determined by using a method shown in the following formula:

$$P_4(k) = e^{j\pi\theta_1 k} e^{j\pi\omega_1}$$

$P_4(k)$ is a $k^{th}$ element of the fourth phase factor, and $\theta_1$ and $\omega_1$ are constants related to the first data length M.

$\theta_0$, $\theta_1$, $\omega_0$, and $\omega_1$ satisfy the following relationship:

$$\omega_1 - \omega_0 = -\frac{1}{2}(\theta_1 - \theta_0)(M-1) + p; \text{ or}$$
$$\omega_1 - \omega_0 = \frac{1}{2} - \frac{1}{2}(\theta_1 - \theta_0)(M-1) + p$$

p is any integer, and M is the first data length.

In a possible implementation, if the first phase factor $P_1$ is different from the second phase factor $P_2$, the first phase factor, the second phase factor, the third phase factor $P_3$, and the fourth phase factor $P_4$ may alternatively be determined in the following manner.

In a possible implementation, $$P_1(m) = P(m)e^{j\pi\omega_0}, \ P_2(m) = P(m)$$

-continued $$P_3(k) = e^{j\pi\omega_0 k} \text{ and } P_4(k) = e^{j\pi\omega_1 k} e^{j\pi\omega_1}$$

m=0, 1, . . . , M−1, k=0, 1, . . . , M−1, and a value of P(m) may be as follows:

$$P(m) = e^{-j\frac{\pi}{M}m};$$

$$P(m) = e^{-j\left(\frac{\pi}{M}+\frac{\pi}{2}\right)m};$$

$$P(m) = e^{-j\left(\frac{\pi}{M}-\frac{\pi}{2}\right)m};$$

$$P(m) = e^{j\frac{\pi(M-1)}{M}m}; \text{ or}$$

$$P(m) = e^{-j\frac{\pi(M+1)}{M}m}$$

m is an index value, P(m) is an $m^{th}$ element, j is an imaginary symbol, and M is the first data length.

In another possible implementation, $$P_1(m) = P(m),\ P_2(m) = P(m)e^{j\pi\omega_1}$$

$$P_3(k) = e^{j\pi\theta_0 k} e^{j\pi\omega_0} \text{ and } P_4(k) = e^{j\pi\theta_1 k}$$

In still another possible implementation, $$P_1(m) = P(m)e^{j\pi\omega_0},\ P_2(m) = P(m)e^{j\pi\omega_1}$$

$$P_3(k) = e^{j\pi\theta_0 k} \text{ and } P_4(k) = e^{j\pi\theta_1 k}$$

In the foregoing possible implementation, values of $\theta_0$, $\theta_1$, $\omega_0$, and $\omega_1$ are described above.

For example, $P_1(m)=P(m)$, $P_2(m)=P(m)e^{j\pi\omega_1}$, $P_3(k)=e^{j\pi\theta_0 k}e^{j\pi\omega_0}$, and $P_4(k)=e^{j\pi\theta_1 k}$.

For example, values of $P_1(m)$, $P_2(m)$, $P_3(k)$, and $P_4(k)$ may be as follows:

$$P_1(m) = e^{-j\frac{\pi}{M}m} \text{ and } P_2(m) = e^{-j\frac{\pi}{M}m} e^{j\frac{\pi(M-1)}{2M}}$$

$$P_3(k) = 1 \text{ and } P_4(k) = e^{-j\frac{\pi}{M}k}; \text{ or}$$

$$P_1(m) = e^{-j\frac{\pi}{M}m} \text{ and } P_2(m) = e^{-j\frac{\pi}{M}m} e^{-j\frac{\pi}{2}}$$

$$P_3(k) = 1 \text{ and } P_4(k) = e^{-j\frac{\pi}{M-1}k}$$

Phase rotation is performed on the first channel of frequency domain data based on the third phase factor, to obtain the first channel of frequency domain rotated data. Phase rotation is performed on the second channel of frequency domain data based on the fourth phase factor, to obtain the second channel of frequency domain rotated data. For a specific implementation method, refer to the method for performing phase rotation on the first channel of frequency domain data in step S303 in the foregoing embodiment.

S504: Perform addition and combination on the first channel of frequency domain rotated data and the second channel of frequency domain rotated data to obtain combined frequency domain rotated data.

A data length of the combined frequency domain rotated data may be the same as that of the first channel of frequency domain rotated data, or a data length of the combined frequency domain rotated data may be different from that of the first channel of frequency domain rotated data.

Addition and combination are performed on corresponding elements in the first channel of frequency domain rotated data and the second channel of frequency domain rotated data to obtain the combined frequency domain rotated data.

The first channel of frequency domain rotated data is represented as $$X_1^{post},$$

and the second channel of frequency domain rotated data is represented as $$X_2^{post},$$

The combined frequency domain rotated data is represented as $X^{post}$.

When the data length of the combined frequency domain rotated data may be the same as that of the first channel of frequency domain rotated data, the combined frequency domain rotated data may be represented as:

$$X^{post}(k) = X_1^{post}(k) + X_2^{post}(k),\ k = 0, 1, \ldots, M-1$$

S505: Perform time domain transform on the combined frequency domain rotated data to obtain time domain data.

Performing time domain transform on the combined frequency domain rotated data may be to perform time domain transform through inverse Fourier transform (inverse Fourier transform), inverse fast Fourier transform (inverse Fast Fourier transform, IFFT), inverse discrete Fourier transform (inverse Discrete Fourier Transform, IDFT), or the like, to obtain the time domain data.

Specifically, when the data length of the combined frequency domain rotated data is the same as that of the first channel of frequency domain rotated data, time domain transform is performed on the combined frequency domain rotated data to obtain the time domain data.

If the data length of the combined frequency domain rotated data is greater than that of the first channel of frequency domain rotated data, frequency domain filtering may be performed on the combined frequency domain data to obtain filtered data; and time domain transform is performed on the filtered data to obtain the time domain data.

In a possible implementation, the data length of the combined frequency domain rotated data is twice the first data length. Therefore, the combined frequency domain rotated data may be represented as:

$$X^{post}(k) = \begin{cases} X_1^{post}(k) + X_2^{post}(k), & 0 \le k < M \\ X_1^{post}(k-M) - X_2^{post}(k-M), & M \le k < 2M \end{cases}, \text{ or}$$

$$X^{post}(k) = \begin{cases} X_1^{post}(k) + X_2^{post}(k), & 0 \le k < M \\ X_1^{post}(k \bmod M) - X_2^{post}(k \bmod M), & M \le k < 2M \end{cases}$$

The foregoing formula may alternatively be represented as:

$$X^{post}(k)=X_1^{post}(k \bmod M)+e^{j\pi\lfloor k/M\rfloor}X_2^{post}(k \bmod M),\ k=0,1,\ldots,2M-1$$

$X^{post}(k)$ is a $k^{th}$ element of the combined frequency domain rotated data, $$X_1^{post}(k)$$

is a $k^{th}$ element of the first channel of frequency domain rotated data, $$X_2^{post}(k)$$

is a $k^{th}$ element of the second channel of frequency domain rotated data, M is the first data length, and mod is a modulo operation.

In a possible implementation, frequency domain filtering may be performed on the combined frequency domain rotated data $X^{post}$, to obtain filtered data $X^{filter}$ of a length Q. $M \le Q \le 2M$, and Q is a positive integer. Specifically, the filtered data may be represented as:

$$X^{filter}\left(k+k_{offset}^{filter}\right)=X^{post}\left(k+k_{offset}^{filter}\right)\times S^{filter}\left(k+k_{offset}^{filter}\right),\ k=0,1,\ldots,Q-1$$

$S^{filter}$ is a coefficient of a filter. For a specific filtering method, refer to the filtering method in the foregoing embodiment. Details are not described herein again.

In a possible implementation, a cyclic shift may be further performed on the combined frequency domain rotated data to obtain shift data; and time domain transform is performed on the shift data to obtain the time domain data. A specific example may be as follows:

A cyclic shift is performed on the combined frequency domain rotated data $X^{post}$ of a length 2M to obtain shift data $$X_{shift}^{post}$$

of the length 2M. Specifically, the shift data may be represented as:

$$X_{shift}^{post}(k)=X^{post}\left[\left(k+k_{offset}^{shift}\right) \bmod 2M\right],\ k=0,1,\ldots,2M-1\ k_{offset}^{shift}$$

is a shift factor of the cyclic shift, is an integer, and may be predefined. For example, $$k_{offset}^{shift}=-M/2.$$

It should be noted that the addition and combination and the cyclic shift may be represented by using a same expression. For example, when $$k_{offset}^{shift}=-M/2,$$

the addition and combination and the cyclic shift are performed on the two channels of frequency domain rotated data $$X_1^{post}$$

and $$X_2^{post}$$

to obtain the shift data $$X_{shift}^{post},$$

which may be represented as:

$$X_{shift}^{post}(k)=\begin{cases}X_1^{post}(k+M/2)-X_2^{post}(k+M/2) & 0\le k<M/2\\ X_1^{post}(k-M/2)+X_2^{post}(k-M/2), & M/2\le k<3M/2\\ X_1^{post}(k-3M/2)-X_2^{post}(k-3M/2) & 3M/2\le k<2M\end{cases}$$

When the same expression is used for representation, another possible expression is as follows:

$$X_{shift}^{post}(k)=X_1^{post}\left(\left(k+k_{offset}^{shift}\right)\bmod M\right)+e^{j\pi\left\lfloor\frac{\left(k+k_{offset}^{shift}\right)\bmod 2M}{M}\right\rfloor}X_2^{post}\left(\left(k+k_{offset}^{shift}\right)\bmod M\right),\quad k=0,1,\ldots,2M-1$$

Frequency domain filtering is performed on the shift data $$X_{shift}^{post}$$

of the length 2M to obtain the filtered data $X^{filter}$ of the length Q. For details, refer to the filtering method in the foregoing embodiment.

In a possible implementation, if the first phase factor $P_1$ is the same as the second phase factor $P_2$, the first channel of frequency domain data and the second channel of frequency domain data that correspond to the two channels of modulated data and that are included in the modulated data may be represented by frequency domain data corresponding to one channel of modulated data and that is included in the modulated data. Specifically, the first channel of frequency domain data and the second channel of frequency domain data may be represented as:

$$X_1(k)=\frac{1}{2}\{X(k)+[X(M-1-k)]^*\}$$

$$X_2(k)=\frac{1}{2}\{X(k)-[X(M-1-k)]^*\}$$

$X_1(k)$ is a $k^{th}$ element of the first channel of frequency domain data when the modulated data includes two channels of modulated data, $X_2(k)$ is a $k^{th}$ element of the second channel of frequency domain data when the modulated data includes the two channels of modulated data, and X(k) is a $k^{th}$ element of corresponding frequency domain data X when the modulated data includes one channel of modulated data.

Correspondingly, it is easily learned that when the modulated data includes two channels of modulated data, the corresponding first channel of frequency domain rotated data $$X_1^{post}$$

and the corresponding second channel of frequency domain rotated data $$X_2^{post}$$

may be represented as:

$$X_1^{post}(k) = X_1(k) \times P_3(k) = \frac{1}{2}\{X(k) + [X(M-1-k)]*\} \times P_3(k)$$

$$X_2^{post}(k) = X_2(k) \times P_4(k) = \frac{1}{2}\{X(k) - [X(M-1-k)]*\} \times P_4(k)$$

Correspondingly, when the data length of the combined frequency domain rotated data is the same as that of the first channel of frequency domain rotated data, when the modulated data includes two channels of modulated data, the frequency domain rotated data $X^{post}$ obtained by performing addition and combination on the corresponding first channel of frequency domain rotated data and the corresponding second channel of frequency domain rotated data may alternatively be represented as:

$$X^{post}(k) = \frac{1}{2}\{X(k) + [X(M-1-k)]^*\} \times P_3(k) + \frac{1}{2}\{X(k) + [X(M-1-k)]^*\} \times P_4(k) = \frac{1}{2}X(k) \times (P_3(k) + P_4(k)) + \frac{1}{2}[X(M-1-k)]^* \times (P_3(k) - P_4(k))$$

In this case, $P_3(k)$ corresponds to $$P_0^{post}(k)$$

in the foregoing embodiment, and $P_4(k)$ corresponds to $$P_1^{post}(k)$$

in the foregoing embodiment.

S506: Send the time domain data.

For step S506, refer to the implementation of step S305 in the foregoing embodiment. Details are not described herein again.

In a possible implementation, the first phase factor, the second phase factor, the third phase factor, and the fourth phase factor may alternatively be prestored phase factors, and are specifically stored in a network device and a terminal device. The terminal device and the network device obtain the third phase factor and the fourth phase factor in a reading manner.

In a possible implementation, the first phase factor, the second phase factor, the third phase factor, and the fourth phase factor may alternatively be indicated by the network device by using signaling, for example, higher layer signaling or dynamic signaling, and sent to the network device.

Time domain data of an SC-FDMA waveform may be approximately considered to be obtained by superposing each piece of modulated data after oversampling is performed by using a SINC function. Therefore, in this embodiment, operations of both the first phase rotation and the second phase rotation are introduced, and each channel of data has a phase factor of the first phase rotation and a phase factor of the second phase rotation. In this way, a relative position of SINC functions corresponding to two channels of modulated data is changed, and a probability of superposition in a same direction between the SINC functions corresponding to the two channels of modulated data is reduced, so that an amplitude of time domain data after superposition changes more smoothly, thereby reducing a maximum amplitude of the time domain data and reducing a PAPR.

Figure 5B:
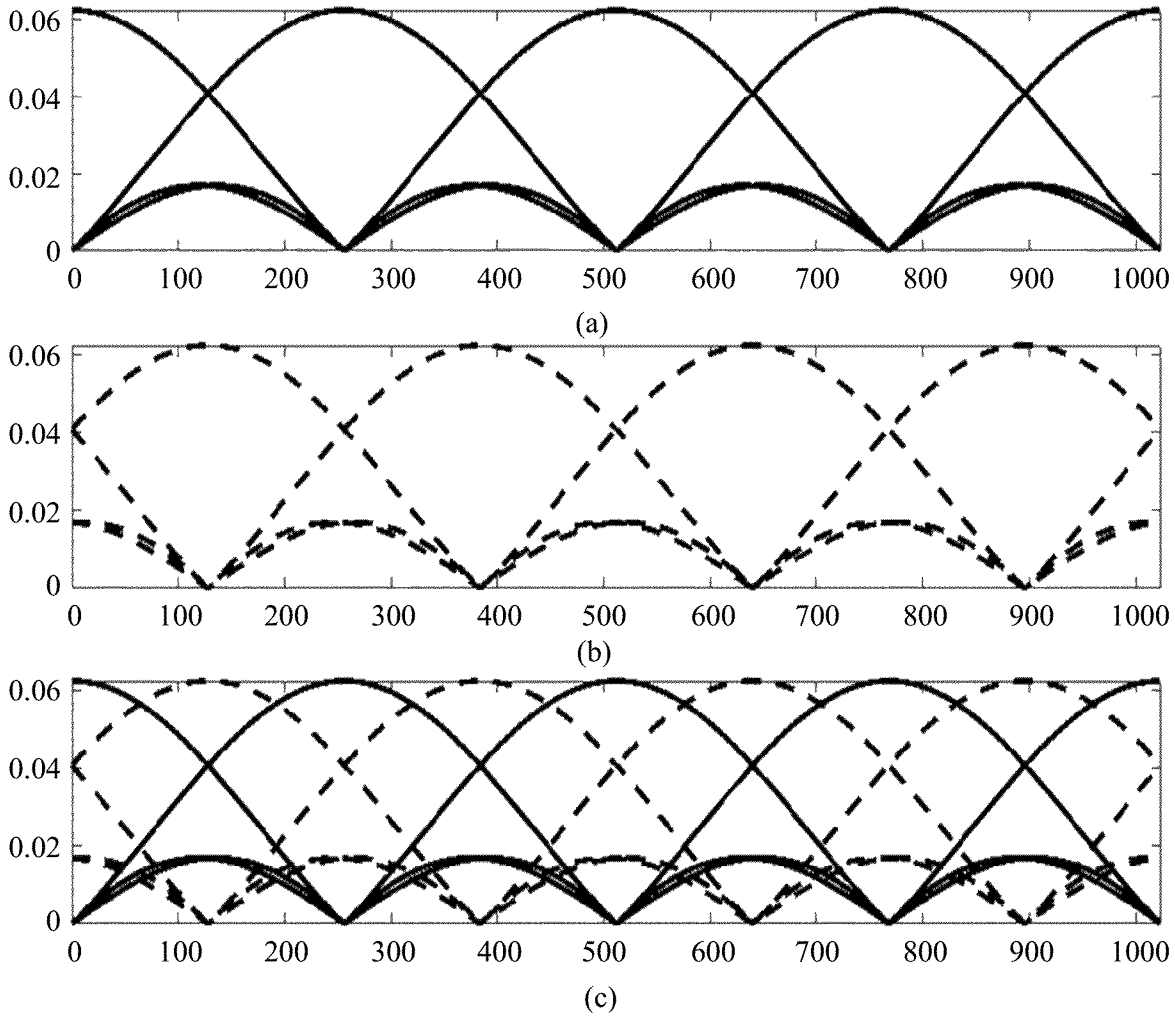
FIG. 5B is a schematic diagram of a waveform for processing a first channel of modulated data and second modulated data.

FIG. 5B is a schematic diagram of a waveform for processing a first channel of modulated data and second modulated data.

Different from a conventional SC-FDMA waveform, as shown in (a) in FIG. 5B and (b) in FIG. 5B, (a) in FIG. 5B shows time domain data corresponding to a first channel of modulated data, (b) in FIG. 5B shows time domain data corresponding to a second channel of modulated data, and (c) in FIG. 5B is a schematic diagram of drawing the time domain data corresponding to the first channel of modulated data and the time domain data corresponding to the second channel of modulated data. Operations of both the first phase rotation and the second phase rotation are introduced, so that different cyclic shifts may be generated between the time domain data corresponding to the first channel of modulated data and the time domain data corresponding to the second channel of modulated data, a relative position of SINC functions corresponding to different modulated data is changed, and a probability of superposition in a same direction between the SINC functions corresponding to different modulated data is reduced, so that an amplitude of time domain data after superposition changes more smoothly, thereby reducing a maximum amplitude of the time domain data and reducing a PAPR.

In addition, because different cyclic shifts are generated between the time domain data corresponding to the first channel of modulated data and the time domain data corresponding to the second channel of modulated data, the two channels of modulated data interfere with each other. In this application, a special phase factor design in the first phase rotation and the second phase rotation is introduced, to ensure that interference between the two channels of modulated data can be entirely eliminated, and orthogonality between the two channels of modulated data is implemented, thereby not affecting demodulation performance.

Figure 6:
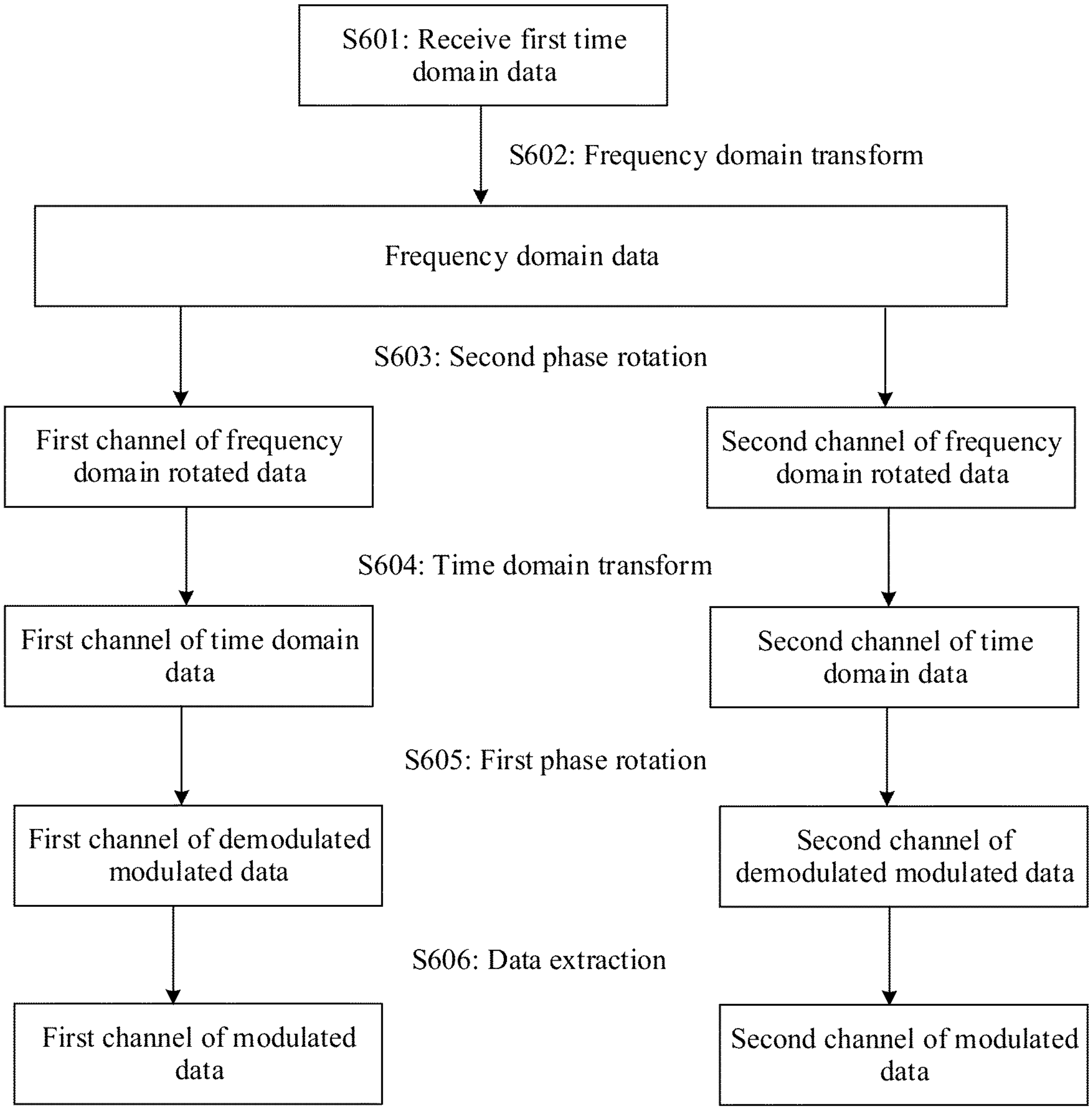
FIG. 6 is a schematic diagram of a data receiving method according to an embodiment of this application.

FIG. 6 is a schematic diagram of a data receiving method according to an embodiment of this application. As shown in FIG. 6, the data receiving method is applied to a network device, and the method includes the following steps.

S601: Receive first time domain data.

S602: Perform frequency domain transform on the first time domain data to obtain frequency domain data.

S603: Perform phase rotation on the frequency domain data based on a third phase factor, to obtain a first channel of frequency domain rotated data, and perform phase rotation on the frequency domain data based on a fourth phase factor, to obtain a second channel of frequency domain rotated data.

The third phase factor and the fourth phase factor may be preconfigured. The third phase factor is related to a data length of a first channel of modulated data sent by a terminal device, and the fourth phase factor is related to a data length of a second channel of modulated data sent by the terminal device. For a specific obtaining manner, refer to the obtaining method for determining the third phase factor and the fourth phase factor in the foregoing embodiment.

For performing phase rotation on the frequency domain data based on the third phase factor, to obtain the first channel of frequency domain rotated data, and performing phase rotation on the frequency domain data based on the fourth phase factor, to obtain the second channel of frequency domain rotated data, refer to the specific implementation of performing phase rotation on the frequency domain data in step S403 in the foregoing embodiment. Details are not described herein again.

S604: Perform time domain transform on the first channel of frequency domain rotated data to obtain a first channel of time domain data, and perform time domain transform on the second channel of frequency domain rotated data to obtain a second channel of time domain data.

A method for performing time domain transform on the frequency domain data may be to perform time domain transform through inverse Fourier transform (inverse Fourier transform), inverse fast Fourier transform (inverse Fast Fourier transform, IFFT), inverse discrete Fourier transform (inverse Discrete Fourier Transform, IDFT), or the like.

S605: Perform phase rotation on the first channel of time domain data based on a first phase factor, to obtain a first channel of demodulated modulated data, and perform phase rotation on the second channel of time domain data based on a second phase factor, to obtain a second channel of demodulated modulated data.

For step S605, refer to the implementation method of step S405. Details are not described herein again.

S606: Perform data extraction on the first channel of demodulated modulated data to obtain a first channel of modulated data, and perform data extraction on the second channel of demodulated modulated data to obtain a second channel of modulated data.

A method for performing data extraction on the first channel of modulated data may be: extracting a data type of the first channel of modulated data, where the data type includes a pure real number and a pure imaginary number; and performing data extraction based on the data type, to obtain the first channel of modulated data. A specific example may be as follows: For example, if the first channel of modulated data is the pure real number, a pure real number in the first channel of demodulated modulated data is extracted to obtain the first channel of modulated data. For a method for obtaining the second channel of modulated data, refer to the method for obtaining the first channel of modulated data. Details are not described herein again.

As described above, interference is generated between the first channel of modulated data and the second channel of modulated data. In this application, phase factors of first phase rotation and second phase rotation are specially designed, so that the interference between the first channel of modulated data and the second channel of modulated data can be entirely eliminated through data extraction, thereby not affecting demodulation performance. Specifically, if the first channel of modulated data is the pure real number, a value corresponding to interference of the second channel of modulated data to the first channel of modulated data is only a pure imaginary number. Therefore, in the data extraction method, only a real part of the first channel of demodulated modulated data needs to be extracted to obtain a pure real number, so that the interference can be entirely eliminated.

For an implementation method of step S601 and step S602, refer to the method corresponding to step S401 and step S402 in the foregoing embodiment. Details are not described herein again.

Figure 7:
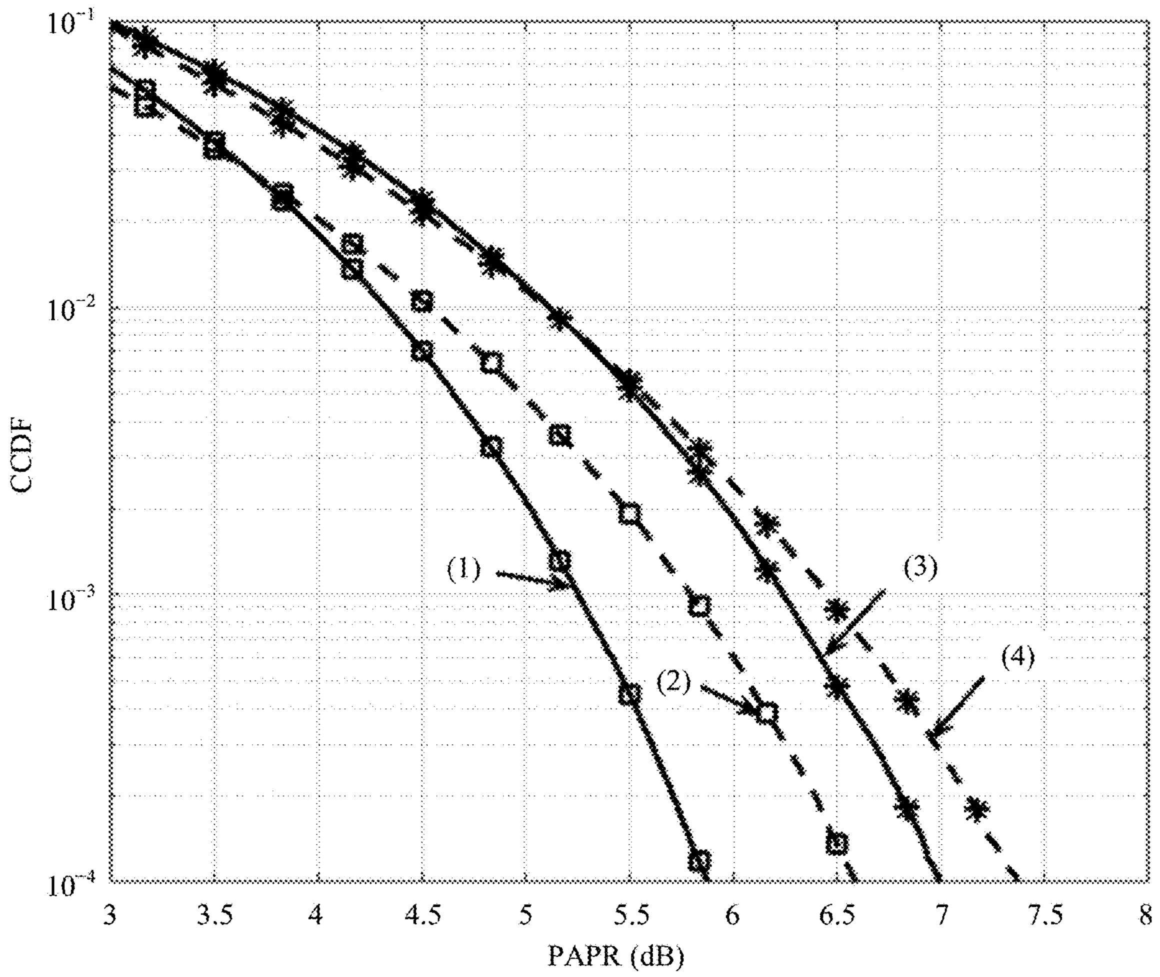
FIG. 7 is a schematic diagram of PAPR performance comparison according to an embodiment of this application.

FIG. 7 is a schematic diagram of PAPR performance comparison according to an embodiment of this application. As shown in FIG. 7, a horizontal coordinate is a PAPR value, and a vertical coordinate is a complementary cumulative distribution function (complementary cumulative distribution function, CCDF). In the example in FIG. 7, a length of modulated data is M=48. A curve (1) shows a PAPR of time domain data generated by using QPSK modulation in this application. A curve (2) shows a PAPR of time domain data generated by using QPSK modulation in a conventional SC-FDMA waveform. A curve (3) shows a PAPR of time domain data generated by using 16 QAM modulation in this application. A curve (4) shows a PAPR of time domain data generated by using 16 QAM modulation in an SC-FDMA waveform.

By comparing the curve (1) and the curve (2), it can be learned that the PAPR of the time domain data generated by using the method in this embodiment when QPSK modulation is used is about 0.8 dB lower than the PAPR of the conventional SC-FDMA waveform. By comparing the curve (3) and the curve (4), it can be learned that the PAPR of the time domain data generated by using the method in this embodiment when 16 QAM modulation is used is about 0.4 dB lower than the PAPR of the conventional SC-FDMA waveform.

Figure 8:
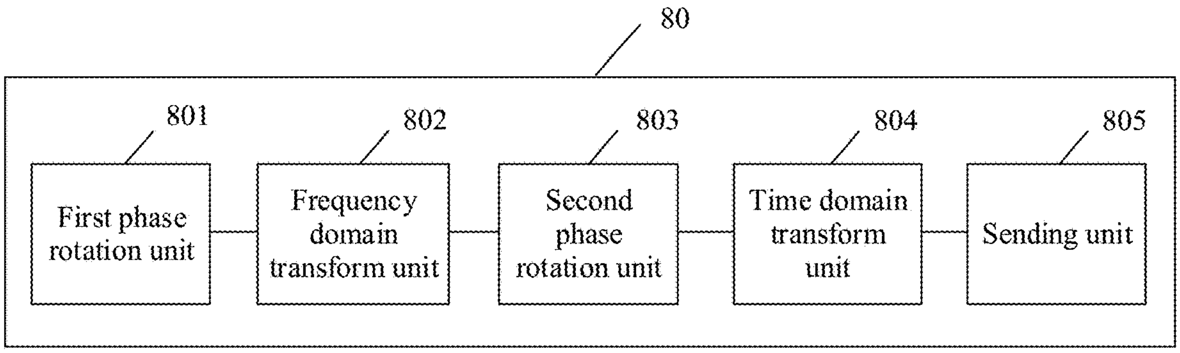
FIG. 8 is a schematic structural diagram of a terminal device according to an embodiment of this application.

FIG. 8 is a schematic structural diagram of a terminal device according to an embodiment of this application. As shown in FIG. 8, the terminal device 80 includes:

a first phase rotation unit 801, configured to perform first phase rotation on modulated data to obtain time domain rotated data;

a frequency domain transform unit 802, configured to perform frequency domain transform on the time domain rotated data to obtain frequency domain data;

a second phase rotation unit 803, configured to perform second phase rotation on the frequency domain data to obtain frequency domain rotated data;

a time domain transform unit 804, configured to perform time domain transform on the frequency domain rotated data to obtain time domain data; and a sending unit 805, configured to send the time domain data.

In a possible implementation, the modulated data includes a first channel of modulated data, and the first phase rotation unit 801 is configured to:

obtain a first data length of the first channel of modulated data;

determine a first phase factor based on the first data length; and perform phase rotation on the modulated data based on the first phase factor, to obtain the time domain rotated data.

In a possible implementation, the second phase rotation unit 803 is configured to:

obtain a phase factor corresponding to the frequency domain data, and obtain a phase factor corresponding to conjugate data of the frequency domain data; and perform phase rotation on the frequency domain data and the conjugate data based on the phase factor corresponding to the frequency domain data and the phase factor corresponding to the conjugate data, to obtain the frequency domain rotated data.

In a possible implementation, the modulated data includes a first channel of modulated data and a second channel of modulated data, and the first phase rotation unit 801 is configured to:

obtain a first data length of the first channel of modulated data, and obtain a second data length of the second channel of modulated data;

determine a first phase factor based on the first data length, and determine a second phase factor based on the second data length;

perform phase rotation on the first channel of modulated data based on the first phase factor, to obtain a first channel of time domain rotated data; and perform phase rotation on the second channel of modulated data based on the second phase factor, to obtain a second channel of time domain rotated data.

In a possible implementation, the frequency domain data includes a first channel of frequency domain data and a second channel of frequency domain data, and the second phase rotation unit 803 is configured to:

determine a third phase factor based on a first data length of the first channel of frequency domain data, and determine a fourth phase factor based on a second data length of the second channel of frequency domain data;

perform phase rotation on the first channel of frequency domain data based on the third phase factor, to obtain a first channel of frequency domain rotated data; and perform phase rotation on the second channel of frequency domain data based on the fourth phase factor, to obtain a second channel of frequency domain rotated data.

In a possible implementation, the first data length is equal to the second data length;

the third phase factor is determined by performing a method shown in the following formula:

$$P_3(k) = e^{j\pi\theta_0 k} e^{j\pi\omega_0}, \text{ where}$$

$P_3(k)$ is a $k^{th}$ element of the third phase factor, and $\theta_0$ and $\omega_0$ are constants related to the first data length; and the fourth phase factor is determined by performing a method shown in the following formula:

$$P_4(k) = e^{j\pi\theta_1 k} e^{j\pi\omega_1}, \text{ where}$$

$P_4(k)$ is a $k^{th}$ element of the fourth phase factor, and $\theta_1$ and $\omega_1$ are constants related to the first data length; and $\theta_0$, $\theta_1$, $\omega_0$, and $\omega_1$ satisfy the following relationship:

$$\omega_1 - \omega_0 = -\frac{1}{2}(\theta_1 - \theta_0)(M-1) + p; \text{ or}$$

-continued $$\omega_1 - \omega_0 = \frac{1}{2} - \frac{1}{2}(\theta_1 - \theta_0)(M-1) + p, \text{ where}$$

p is any integer, and M is the first data length.

In a possible implementation, the time domain transform unit is configured to:

perform addition and combination on the first channel of frequency domain rotated data and the second channel of frequency domain rotated data to obtain combined frequency domain rotated data, where a data length of the combined frequency domain rotated data is the same as the first data length; and perform time domain transform on the combined frequency domain rotated data to obtain the time domain data.

In a possible implementation, the time domain transform unit is configured to:

combine the first channel of frequency domain rotated data and the second channel of frequency domain rotated data to obtain combined frequency domain rotated data, where the combined frequency domain rotated data is greater than the first data length;

perform frequency domain filtering on the combined frequency domain rotated data to obtain filtered data; and perform time domain transform on the filtered data to obtain the time domain data.

In a possible implementation, the first phase factor is determined by performing a method shown in the following formula:

$$P_1(m) = e^{-j\frac{\pi}{M}m};$$

$$P_1(m) = e^{-j\left(\frac{\pi}{M}+\frac{\pi}{2}\right)m};$$

$$P_1(m) = e^{-j\left(\frac{\pi}{M}-\frac{\pi}{2}\right)m};$$

$$P_1(m) = e^{-j\frac{\pi(M-1)}{M}m}; \text{ or}$$

$$P_1(m) = e^{-j\frac{\pi(M+1)}{M}m},$$

where m is an index value, $P_1(m)$ is an $m^{th}$ element of the first phase factor, j is an imaginary symbol, and M is the first data length.

In this embodiment, the terminal device 80 is presented in a form of a unit. The "unit" herein may be an application-specific integrated circuit (application-specific integrated circuit, ASIC), a processor and a memory that execute one or more software or firmware programs, an integrated logic circuit, and/or another device that can provide the foregoing functions. In addition, the first phase rotation unit, the frequency domain transform unit 802, the second phase rotation unit 803, and the time domain transform unit may be implemented by using the processor 901 of the terminal device shown in FIG. 9.

Figure 9:
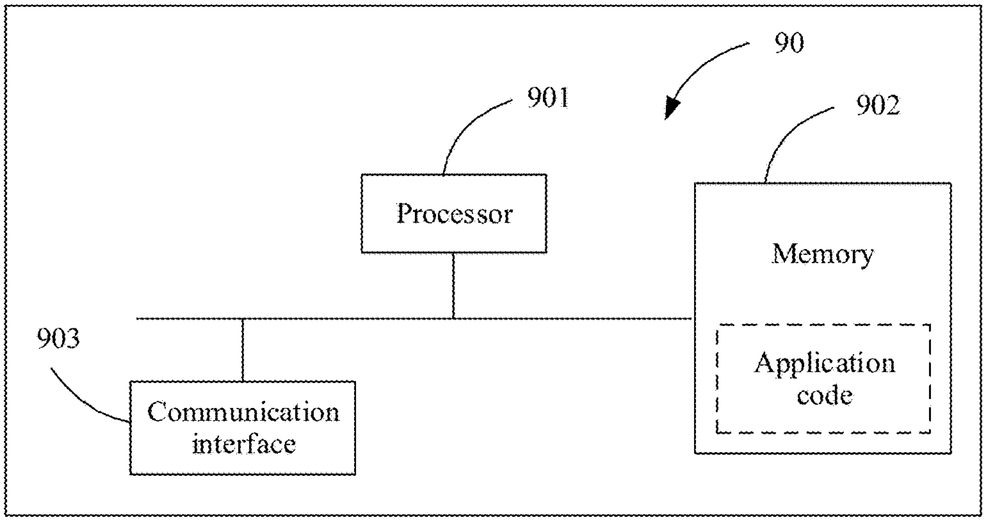
FIG. 9 is a schematic structural diagram of another terminal device according to an embodiment of this application.

A terminal device 90 shown in FIG. 9 may be implemented by using the structure in FIG. 8. The terminal device 90 includes at least one processor 901, at least one memory 902, and at least one communication interface 903. The processor 901, the memory 902, and the communication interface 903 are connected to and communicate with each other through the communication bus.

The processor 901 may be a general-purpose central processing unit (CPU), a microprocessor, an application-specific integrated circuit (application-specific integrated circuit, ASIC), or one or more integrated circuits for controlling program execution of the foregoing solutions.

The communication interface 903 is configured to communicate with another device or a communication network, such as the Ethernet, a radio access network (RAN), or a wireless local area network (Wireless Local Area Network, WLAN).

The memory 902 may be a read-only memory (read-only memory, ROM) or another type of static storage device capable of storing static information and instructions, a random access memory (random access memory, RAM) or another type of dynamic storage device capable of storing information and instructions, or may be an electrically erasable programmable read-only memory (Electrically Erasable Programmable Read-Only Memory, EEPROM), a compact disc read-only memory (Compact Disc Read-Only Memory, CD-ROM) or another compact disc storage, an optical disc storage (including a compact disc, a laser disc, an optical disc, a digital versatile disc, a Blu-ray disc, and the like), a magnetic disk storage medium or another magnetic storage device, or any other medium capable of carrying or storing expected program code in a form of instructions or data structures and capable of being accessed by a computer, but is not limited thereto. The memory may exist independently, and is connected to the processor through the bus. Alternatively, the memory may be integrated with the processor.

The memory 902 is configured to store application code for executing the foregoing solutions, and the processor 901 controls the execution. The processor 901 is configured to execute the application code stored in the memory 902.

The code stored in the memory 902 may perform the data sending method provided above. First phase rotation is performed on modulated data to obtain time domain rotated data. Frequency domain transform is performed on the time domain rotated data to obtain frequency domain data. Second phase rotation is performed on the frequency domain data to obtain frequency domain rotated data. Time domain transform is performed on the frequency domain rotated data to obtain time domain data. The time domain data is sent.

Figure 10:
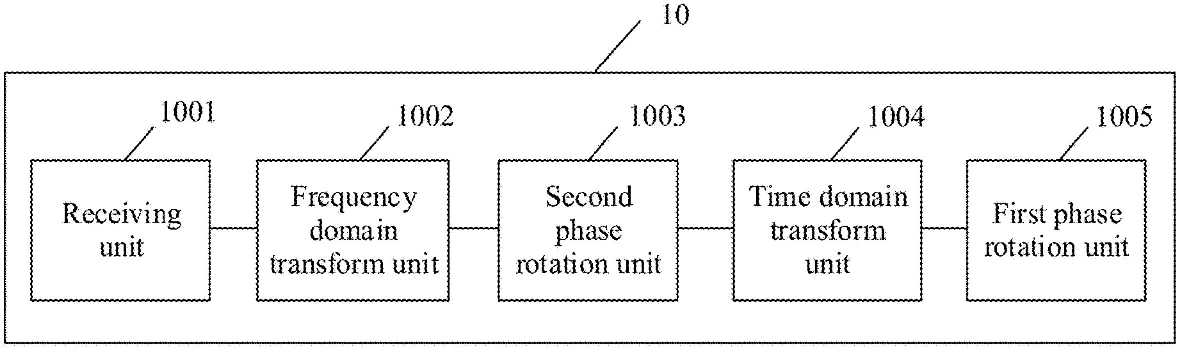
FIG. 10 is a schematic structural diagram of a network device according to an embodiment of this application.

FIG. 10 is a schematic structural diagram of a network device according to an embodiment of this application. As shown in FIG. 10, the network device 10 includes:

- a receiving unit 1001, configured to receive first time domain data;
- a frequency domain transform unit 1002, configured to perform frequency domain transform on the first time domain data to obtain frequency domain data;
- a second phase rotation unit 1003, configured to perform second phase rotation on the frequency domain data to obtain frequency domain rotated data;
- a time domain transform unit 1004, configured to perform time domain transform on the frequency domain rotated data to obtain second time domain data; and
- a first phase rotation unit 1005, configured to perform first phase rotation on the second time domain data to obtain modulated data.

In a possible implementation, the frequency domain rotated data includes a first channel of frequency domain rotated data and a second channel of frequency domain rotated data, and the second phase rotation unit 1003 is configured to:

- obtain a third phase factor and a fourth phase factor;
- perform phase rotation on the frequency domain data based on the third phase factor, to obtain the first channel of frequency domain rotated data; and
- perform phase rotation on the frequency domain data based on the fourth phase factor, to obtain the second channel of frequency domain rotated data.

In a possible implementation, the time domain transform unit 1004 is configured to:

- perform time domain transform on the first channel of frequency domain rotated data to obtain a first channel of time domain data; and
- perform time domain transform on the second channel of frequency domain rotated data to obtain a second channel of time domain data.

In a possible implementation, the modulated data includes a first channel of modulated data and a second channel of modulated data, and the first phase rotation unit 1005 is configured to:

- determine a first phase factor based on a first data length of the first channel of time domain data, and determine a second phase factor based on a second data length of the second channel of time domain data;
- perform phase rotation on the first channel of time domain data based on the first phase factor, to obtain a first channel of demodulated modulated data;
- perform phase rotation on the second channel of time domain data based on the second phase factor, to obtain a second channel of demodulated modulated data;
- perform data extraction on the first channel of demodulated modulated data to obtain the first channel of modulated data; and
- perform data extraction on the second channel of demodulated modulated data to obtain the second channel of modulated data.

In a possible implementation, the second phase rotation unit 1003 is configured to:

- obtain a phase factor corresponding to the frequency domain data, and obtain a phase factor corresponding to conjugate data of the frequency domain data; and
- perform phase rotation on the frequency domain data and the conjugate data based on the phase factor corresponding to the frequency domain data and the phase factor corresponding to the conjugate data, to obtain the frequency domain rotated data.

In a possible implementation, the modulated data includes a first channel of modulated data, and the first phase rotation unit 1005 is configured to:

- determine a first phase factor based on a first data length of the first channel of modulated data; and
- perform phase rotation on the second time domain data based on the first phase factor, to obtain the first channel of modulated data.

In this embodiment, the network device 10 is presented in a form of a unit. The “unit” herein may be an application-specific integrated circuit (application-specific integrated circuit, ASIC), a processor and a memory that execute one or more software or firmware programs, an integrated logic circuit, and/or another device that can provide the foregoing functions. In addition, the frequency domain transform unit 1002, the second phase rotation unit 1003, the time domain transform unit 1004, and the first phase rotation unit 1005 may be implemented by using the processor 1101 of the network device shown in FIG. 11.

Figure 11:
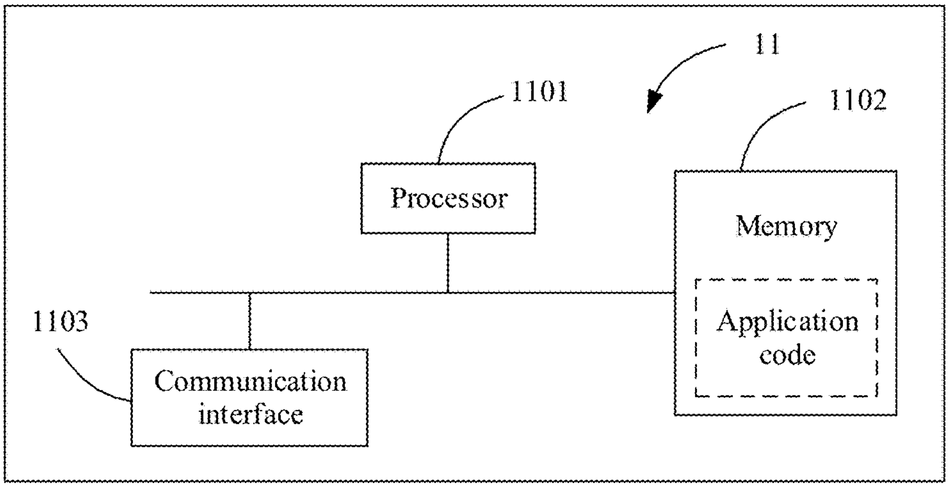
FIG. 11 is a schematic structural diagram of another network device according to an embodiment of this application.

A network device 11 shown in FIG. 11 may be implemented by using the structure in FIG. 10. The network device 11 includes at least one processor 1101, at least one memory 1102, and at least one communication interface 1103. The processor 1101, the memory 1102, and the communication interface 1103 are connected to and communicate with each other through the communication bus.

The processor 1101 may be a general-purpose central processing unit (CPU), a microprocessor, an application-specific integrated circuit (application-specific integrated circuit, ASIC), or one or more integrated circuits for controlling program execution of the foregoing solutions.

The communication interface 1103 is configured to communicate with another device or a communication network, such as the Ethernet, a radio access network (RAN), or a wireless local area network (Wireless Local Area Network, WLAN).

The memory 1102 may be a read-only memory (read-only memory, ROM) or another type of static storage device capable of storing static information and instructions, a random access memory (random access memory, RAM) or another type of dynamic storage device capable of storing information and instructions, or may be an electrically erasable programmable read-only memory (Electrically Erasable Programmable Read-Only Memory, EEPROM), a compact disc read-only memory (Compact Disc Read-Only Memory, CD-ROM) or another compact disc storage, an optical disc storage (including a compact disc, a laser disc, an optical disc, a digital versatile disc, a Blu-ray disc, and the like), a magnetic disk storage medium or another magnetic storage device, or any other medium capable of carrying or storing expected program code in a form of instructions or data structures and capable of being accessed by a computer, but is not limited thereto. The memory may exist independently, and is connected to the processor through the bus. Alternatively, the memory may be integrated with the processor.

The memory 1102 is configured to store application code for executing the foregoing solutions, and the processor 1101 controls the execution. The processor 1101 is configured to execute the application code stored in the memory 1102.

The code stored in the memory 1102 may perform the data receiving method provided above. First time domain data is received. Frequency domain transform is performed on the first time domain data to obtain frequency domain data. Second phase rotation is performed on the frequency domain data to obtain frequency domain rotated data. Time domain transform is performed on the frequency domain rotated data to obtain second time domain data. First phase rotation is performed on the second time domain data to obtain modulated data.

An embodiment of this application further provides a computer storage medium. The computer storage medium may store a program. When the program is executed, some or all steps of any data sending method and any data receiving method described in the foregoing method embodiments are included.

It should be noted that for ease of brief description, the foregoing method embodiments are represented as a series of action combinations. However, a person skilled in the art should appreciate that this application is not limited to the described order of the actions, and because according to this application, some steps may be performed in other orders or simultaneously. It should be further appreciated by a person skilled in the art that embodiments described in this specification all belong to preferable embodiments, and the related actions and modules are not necessarily required by this application.

In the foregoing embodiments, the descriptions of each embodiment have respective focuses. For a part that is not described in detail in an embodiment, refer to related descriptions in other embodiments.

In the several embodiments provided in this application, it should be understood that the disclosed apparatus may be implemented in other manners. For example, the described apparatus embodiments are merely examples. For example, division into the units is merely logical function division, and may be other division during actual implementation. For example, a plurality of units or components may be combined or may be integrated into another system, or some features may be ignored or not performed. In addition, the displayed or discussed mutual couplings or direct couplings or communication connections may be implemented through some interfaces. The indirect couplings or communication connections between the apparatuses or the units may be implemented in electrical or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable memory. Based on such an understanding, the technical solutions of this application essentially, or the part contributing to the conventional technology, or all or some of the technical solutions may be implemented in the form of a software product. The computer software product is stored in a memory and includes several instructions for instructing a computer device (which may be a personal computer, a server, or a network device) to perform all or some of the steps of the methods described in embodiments of this application. The foregoing memory includes any medium that can store program code, such as a USB flash drive, a read-only memory (ROM, Read-Only Memory), a random access memory (RAM, Random Access Memory), a removable hard disk, a magnetic disk, or an optical disc.

A person of ordinary skill in the art may understand that all or some of the steps of the methods in embodiments may be implemented by a program instructing related hardware. The program may be stored in a computer-readable memory. The memory may include a flash memory, a read-only memory (English: Read-Only Memory, ROM for short), a random access memory (English: Random Access Memory, RAM for short), a magnetic disk, an optical disc, or the like.

Embodiments of this application are described in detail above. The principle and the implementation of this application are described in this specification by using specific examples. The descriptions about the embodiments are merely provided to help understand the method and the core idea of this application. In addition, a person of ordinary skill in the art makes variations to the specific implementations and the application scope based on the idea of this application. Therefore, the content of this specification shall not be construed as a limitation on this application.

What is claimed is:

1. A method for sending data, performed by a terminal device, the method comprising:

performing first phase rotation on modulated data to obtain time domain rotated data;

performing frequency domain transform on the time domain rotated data to obtain frequency domain data;

performing second phase rotation on the frequency domain data to obtain frequency domain rotated data, wherein the performing of the second phase rotation comprises:

obtaining a phase factor corresponding to the frequency domain data and obtaining a phase factor corresponding to conjugate data of the frequency domain data, wherein each conjugate data comprises a respective conjugate-symmetric frequency-domain component; and performing phase rotation on the frequency domain data and the conjugate data based on the phase factor corresponding to the frequency domain data and the phase factor corresponding to the conjugate data to obtain the frequency domain rotated data;

performing time domain transform on the frequency domain rotated data to obtain time domain data; and sending the time domain data.

2. The method according to claim 1, wherein the modulated data comprises a first channel of modulated data, and the performing of the first phase rotation on the modulated data to obtain the time domain rotated data comprises:

obtaining a first data length of the first channel of modulated data;

determining a first phase factor based on the first data length; and performing phase rotation on the modulated data based on the first phase factor to obtain the time domain rotated data.

3. The method according to claim 1, wherein the modulated data comprises a first channel of modulated data and a second channel of modulated data, and the performing of the first phase rotation on the modulated data to obtain the time domain rotated data comprises:

obtaining a first data length of the first channel of modulated data and obtaining a second data length of the second channel of modulated data;

determining a first phase factor based on the first data length and determining a second phase factor based on the second data length;

performing phase rotation on the first channel of modulated data based on the first phase factor to obtain a first channel of time domain rotated data; and performing phase rotation on the second channel of modulated data based on the second phase factor to obtain a second channel of time domain rotated data.

4. The method according to claim 3, wherein the frequency domain data comprises a first channel of frequency domain data and a second channel of frequency domain data, and the performing of the second phase rotation on the frequency domain data to obtain frequency domain rotated data comprises:

determining a third phase factor based on a first data length of the first channel of frequency domain data, and determining a fourth phase factor based on a second data length of the second channel of frequency domain data;

performing phase rotation on the first channel of frequency domain data based on the third phase factor, to obtain a first channel of frequency domain rotated data; and performing phase rotation on the second channel of frequency domain data based on the fourth phase factor, to obtain a second channel of frequency domain rotated data.

5. The method according to claim 4, wherein:

the first data length is equal to the second data length;

the third phase factor is determined by the following formula:

$$P_3(k) = e^{j\pi\theta_0 k} e^{j\pi\omega_0}, \text{ wherein:}$$

$P_3(k)$ is a $k^{th}$ element of the third phase factor, and $\theta_0$ and $\omega_0$ are constants related to the first data length; and the fourth phase factor is determined by the following formula:

$$P_4(k) = e^{j\pi\theta_1 k} e^{j\pi\omega_1}, \text{ wherein:}$$

$P_4(k)$ is a $k^{th}$ element of the fourth phase factor, and $\theta_1$ and $\omega_1$ are constants related to the first data length; and $\theta_0$, $\theta_1$, $\omega_0$, and $\omega_1$ satisfy the following relationship:

$$\omega_1 - \omega_0 = -\frac{1}{2}(\theta_1 - \theta_0)(M - 1) + p; \text{ or}$$

$$\omega_1 - \omega_0 = \frac{1}{2} - \frac{1}{2}(\theta_1 - \theta_0)(M - 1) + p,$$

wherein p is any integer, and M is the first data length.

6. The method according to claim 4, wherein the performing of the time domain transform on the frequency domain rotated data to obtain the time domain data comprises:

performing addition and combination on the first channel of frequency domain rotated data and the second channel of frequency domain rotated data to obtain combined frequency domain rotated data, wherein a data length of the combined frequency domain rotated data is the same as the first data length; and performing a time domain transform on the combined frequency domain rotated data to obtain the time domain data.

7. The method according to claim 4, wherein the performing of the time domain transform on the frequency domain rotated data to obtain the time domain data comprises:

combining the first channel of frequency domain rotated data and the second channel of frequency domain rotated data to obtain combined frequency domain rotated data, wherein a data length of the combined frequency domain rotated data is greater than the first data length;

performing frequency domain filtering on the combined frequency domain rotated data to obtain filtered data; and performing time domain transform on the filtered data to obtain the time domain data.

8. The method according to claim 2, wherein the first phase factor is determined by the following formulas:

$$P_1(m) = e^{-j\frac{\pi}{M}m};$$

$$P_1(m) = e^{-j(\frac{\pi}{M}+\frac{\pi}{2})m};$$

$$P_1(m) = e^{-j(\frac{\pi}{M}-\frac{\pi}{2})m};$$

$$P_1(m) = e^{-j\frac{\pi(M-1)}{M}m}; \text{ or}$$

$$P_1(m) = e^{-j\frac{\pi(M+1)}{M}m},$$

wherein m is an index value, $P_1(m)$ is an $m^{th}$ element of the first phase factor, j is an imaginary symbol, and M is the first data length.

9. A method for receiving data, performed by a network device, the method comprising:

receiving first time domain data;

performing frequency domain transform on the first time domain data to obtain frequency domain data;

performing second phase rotation on the frequency domain data to obtain frequency domain rotated data, wherein the performing of the second phase rotation on the frequency domain data to obtain the frequency domain rotated data comprises:

obtaining a phase factor corresponding to the frequency domain data and obtaining a phase factor corresponding to conjugate data of the frequency domain data, wherein each conjugate data comprises a respective conjugate-symmetric frequency-domain component; and performing phase rotation on the frequency domain data and the conjugate data based on the phase factor corresponding to the frequency domain data and the phase factor corresponding to the conjugate data to obtain the frequency domain rotated data;

performing time domain transform on the frequency domain rotated data to obtain second time domain data; and performing first phase rotation on the second time domain data to obtain modulated data.

10. The method according to claim 9, wherein the frequency domain rotated data comprises a first channel of frequency domain rotated data and a second channel of frequency domain rotated data, and the performing of the second phase rotation on the frequency domain data to obtain the frequency domain rotated data comprises:

obtaining a third phase factor and a fourth phase factor;

performing phase rotation on the frequency domain data based on the third phase factor to obtain the first channel of frequency domain rotated data; and performing phase rotation on the frequency domain data based on the fourth phase factor to obtain the second channel of frequency domain rotated data.

11. The method according to claim 10, wherein the performing of the time domain transform on the frequency domain rotated data to obtain the second time domain data comprises:

performing a time domain transform on the first channel of frequency domain rotated data to obtain a first channel of time domain data; and performing a time domain transform on the second channel of frequency domain rotated data to obtain a second channel of time domain data.

12. The method according to claim 11, wherein the modulated data comprises a first channel of modulated data and a second channel of modulated data, and the performing of the first phase rotation on the second time domain data to obtain the modulated data comprises:

determining a first phase factor based on a first data length of the first channel of time domain data and determining a second phase factor based on a second data length of the second channel of time domain data;

performing phase rotation on the first channel of time domain data based on the first phase factor to obtain a first channel of demodulated modulated data;

performing phase rotation on the second channel of time domain data based on the second phase factor to obtain a second channel of demodulated modulated data;

performing data extraction on the first channel of demodulated modulated data to obtain the first channel of modulated data; and performing data extraction on the second channel of demodulated modulated data to obtain the second channel of modulated data.

13. The method according to claim 9, wherein the modulated data comprises a first channel of modulated data and the performing of the first phase rotation on the second time domain data to obtain modulated data comprises:

determining a first phase factor based on a first data length of the first channel of modulated data; and performing phase rotation on the second time domain data based on the first phase factor to obtain the first channel of modulated data.

14. A terminal device, comprising:

a memory with instructions stored thereon;

one or more processors configured to execute the instructions from the memory and cause the terminal device to:

perform first phase rotation on modulated data to obtain time domain rotated data;

perform frequency domain transform on the time domain rotated data to obtain frequency domain data;

perform second phase rotation on the frequency domain data to obtain frequency domain rotated data, wherein the performing of the second phase rotation comprises:

obtaining a phase factor corresponding to the frequency domain data and obtaining a phase factor corresponding to conjugate data of the frequency domain data, wherein each conjugate data comprises a respective conjugate-symmetric frequency-domain component; and performing phase rotation on the frequency domain data and the conjugate data based on the phase factor corresponding to the frequency domain data and the phase factor corresponding to the conjugate data to obtain the frequency domain rotated data;

perform time domain transform on the frequency domain rotated data to obtain time domain data; and send the time domain data.

15. The terminal device according to claim 14, wherein the modulated data comprises a first channel of modulated data, and the instructions further cause the terminal device to:

obtain a first data length of the first channel of modulated data;

determine a first phase factor based on the first data length; and perform phase rotation on the modulated data based on the first phase factor to obtain the time domain rotated data.

16. The terminal device according to claim 14, wherein the modulated data comprises a first channel of modulated data and a second channel of modulated data, and the instructions further cause the terminal device to:

obtain a first data length of the first channel of modulated data and obtain a second data length of the second channel of modulated data;

determine a first phase factor based on the first data length and determine a second phase factor based on the second data length;

perform phase rotation on the first channel of modulated data based on the first phase factor to obtain a first channel of time domain rotated data; and perform phase rotation on the second channel of modulated data based on the second phase factor to obtain a second channel of time domain rotated data.

17. The terminal device according to claim 16, wherein the frequency domain data comprises a first channel of frequency domain data and a second channel of frequency domain data, and the instructions further cause the terminal device to:

determine a third phase factor based on a first data length of the first channel of frequency domain data and determine a fourth phase factor based on a second data length of the second channel of frequency domain data;

perform phase rotation on the first channel of frequency domain data based on the third phase factor to obtain a first channel of frequency domain rotated data; and perform phase rotation on the second channel of frequency domain data based on the fourth phase factor, to obtain a second channel of frequency domain rotated data.

* * * * *